United States Patent [19]
Yamamoto et al.

[11] Patent Number: 5,742,279
[45] Date of Patent: Apr. 21, 1998

[54] INPUT/DISPLAY INTEGRATED INFORMATION PROCESSING DEVICE

[75] Inventors: Hiroshi Yamamoto, Katano; Yasuharu Shimeki, Suita; Kazuhiro Kayashima, Hirakata; Susumu Maruno, Osaka; Makoto Fujimoto, Ibaraki; Yoshihiro Kojima, Kobe, all of Japan

[73] Assignee: Matsushita Electrical Co., Ltd., Osaka, Japan

[21] Appl. No.: 337,372

[22] Filed: Nov. 8, 1994

[30] Foreign Application Priority Data

| Nov. 8, 1993 | [JP] | Japan | 5-278617 |
| Apr. 12, 1994 | [JP] | Japan | 6-073201 |
| Jul. 29, 1994 | [JP] | Japan | 6-178079 |
| Aug. 3, 1994 | [JP] | Japan | 6-182288 |
| Aug. 12, 1994 | [JP] | Japan | 6-190465 |

[51] Int. Cl.$^6$ ............................................. G09G 5/00
[52] U.S. Cl. ............................................. 345/173; 345/175
[58] Field of Search ................... 178/18, 20, 19; 348/589, 600, 601; 358/505, 509, 512–514, 448, 450; 345/173–179

[56] References Cited

U.S. PATENT DOCUMENTS

| 4,555,590 | 11/1985 | Kishi et al. | 178/18 |
| 4,763,356 | 8/1988 | Day, Jr. et al. | 178/18 X |
| 4,989,040 | 1/1991 | Matsuo et al. | 178/18 X |
| 5,019,865 | 5/1991 | Tanaka et al. | 178/18 X |
| 5,223,677 | 6/1993 | Kapp et al. | |
| 5,239,373 | 8/1993 | Tang et al. | |
| 5,340,978 | 8/1994 | Rostoker et al. | |
| 5,446,669 | 8/1995 | Birk. | |
| 5,455,898 | 10/1995 | Mahoney et al. | |

FOREIGN PATENT DOCUMENTS

| 568161 | 11/1993 | European Pat. Off. |
| 93/20536 | 10/1993 | WIPO. |

Primary Examiner—Regina Liang
Attorney, Agent, or Firm—Beveridge, DeGrandi, Weilacher & Young, L.L.P.

[57] ABSTRACT

An input/display integrated information processing device has: image display circuit for displaying document and image information; image input circuit through which information of an image such as a picture, a photograph, documents drawn or written on a sheet presented by the user can be an input; a visual coincidence structure for integrally combining a display screen of the image display circuit with an input screen of the image input circuit so as to establish visual coincidence of screens as viewed from the user; contact information detection circuit for, when a finger of the user, the sheet presented by the user, or the like makes contact with the contact information detection circuit, detecting information of a contact position, the contact information detection circuit being disposed on the whole of the input screen of the image input circuit or the display screen of the image display circuit; image extraction circuit for automatically extracting only a required portion from image information input through the image input circuit; image information storage circuit for storing the image information; image synthesize circuit for combining the image with an image which is already displayed and stored; and image information control circuit for controlling input/output operations of the image information.

8 Claims, 21 Drawing Sheets

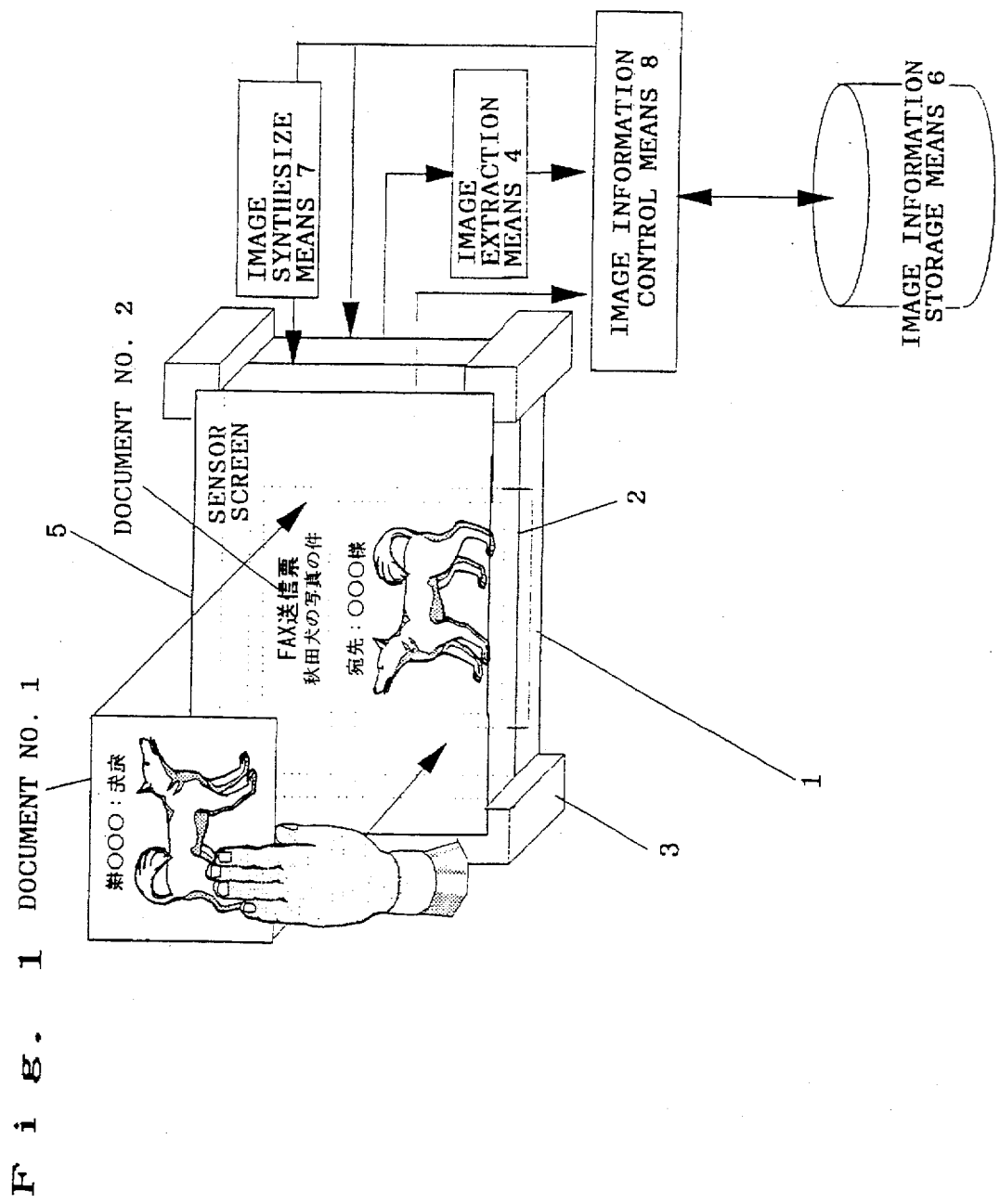

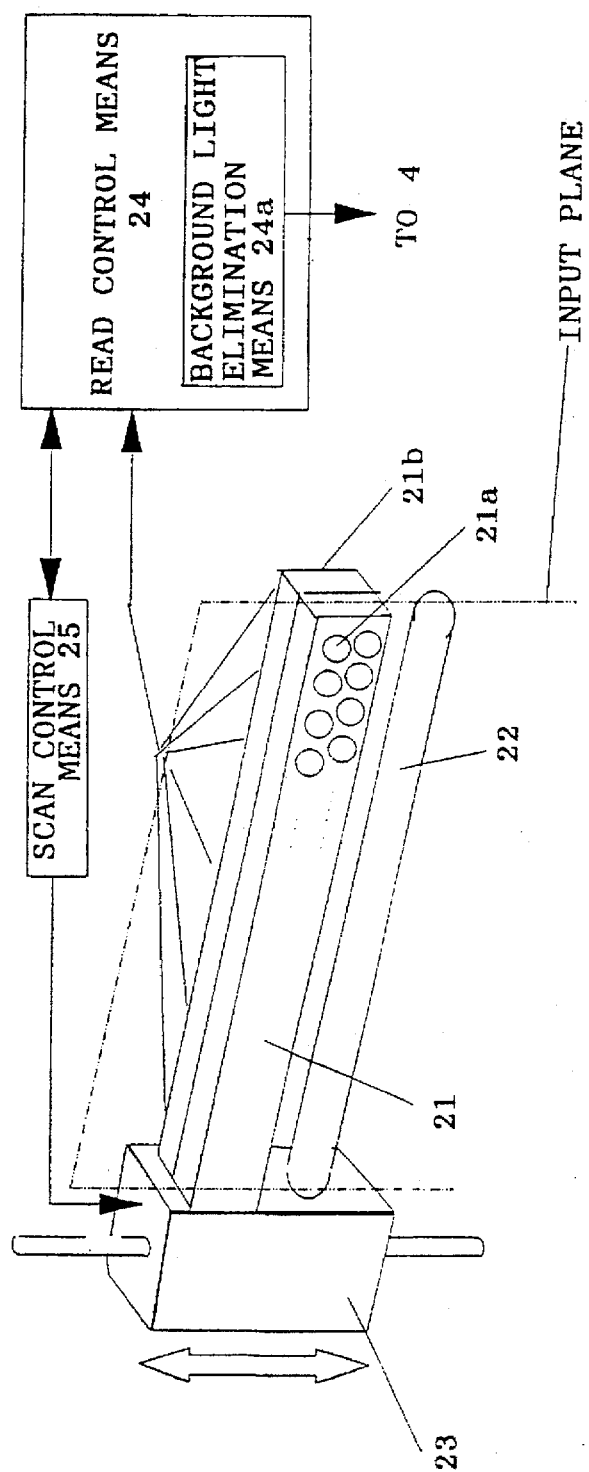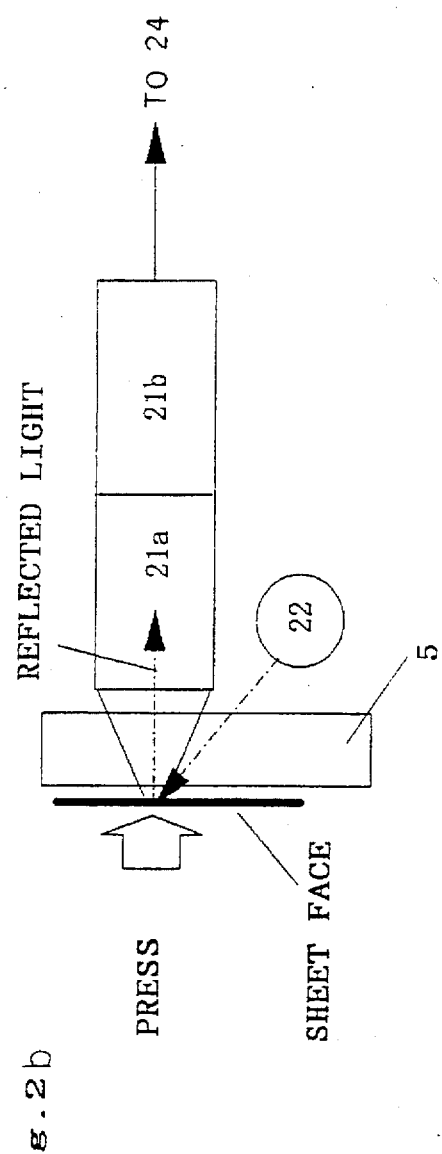
Fig. 2a
Fig. 2b

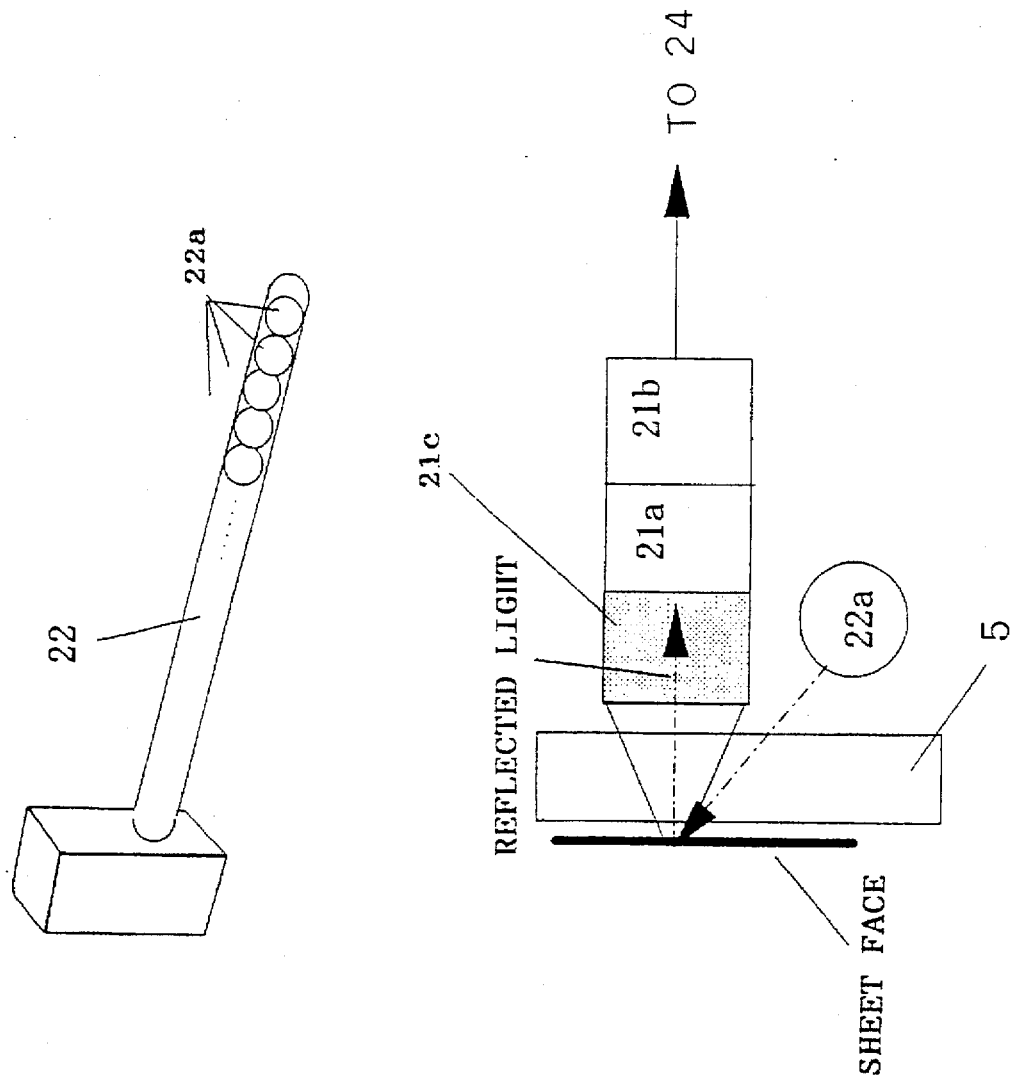

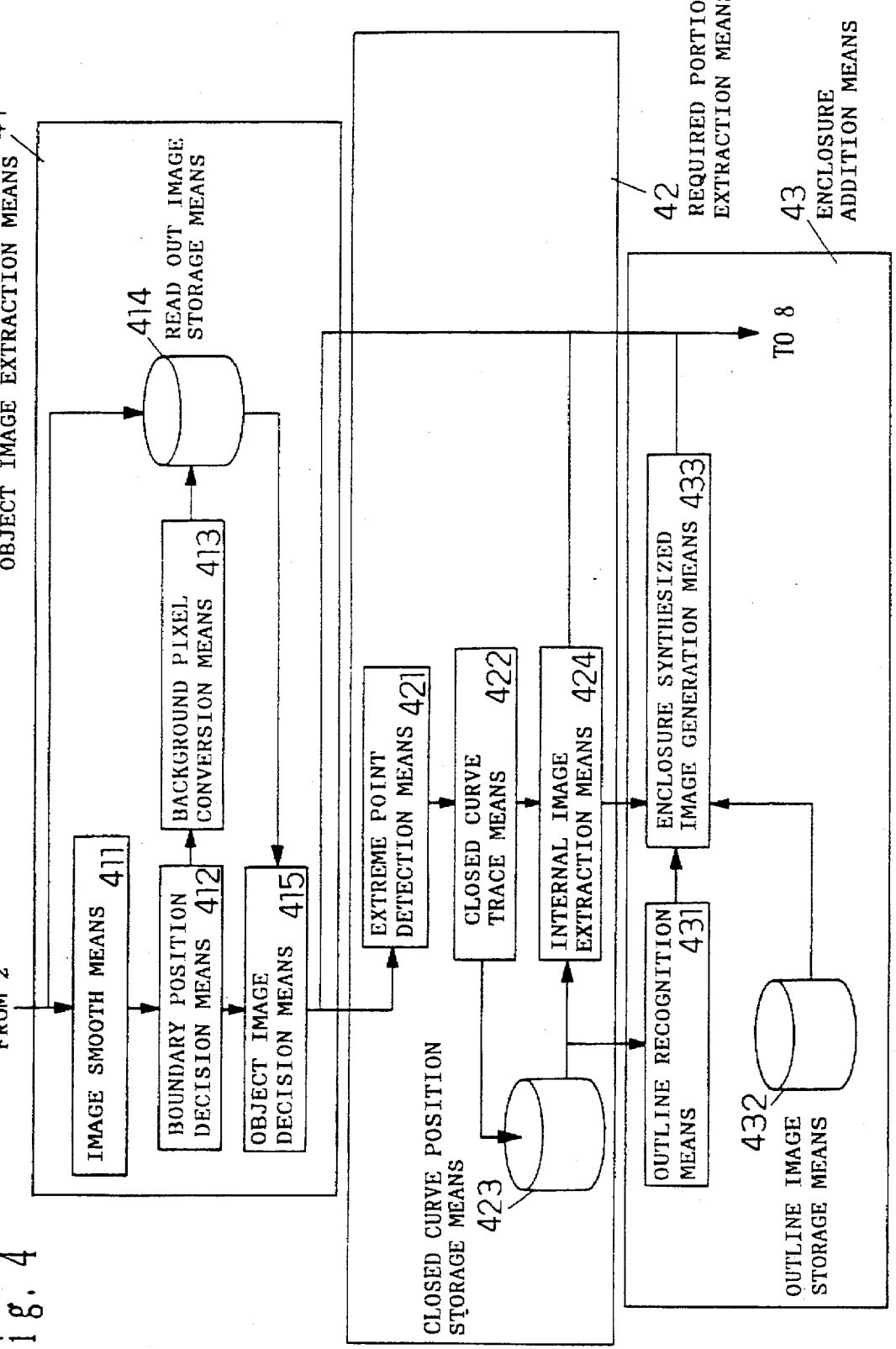

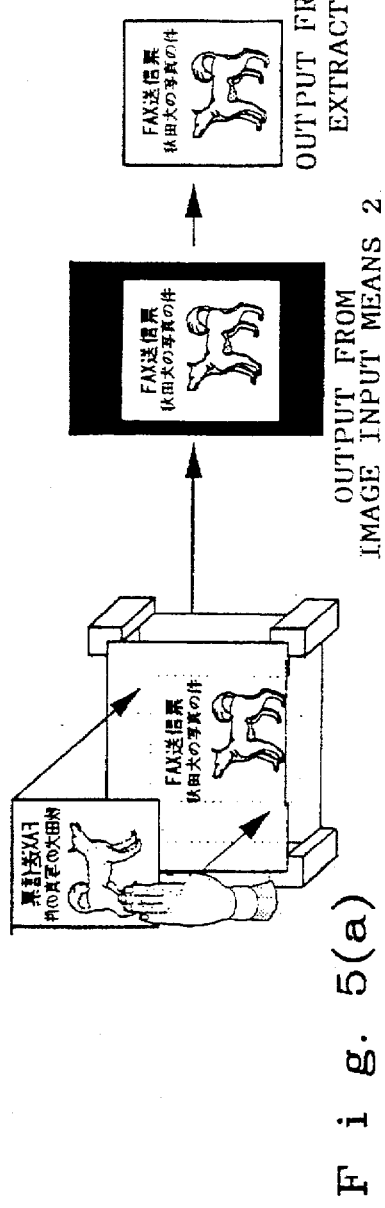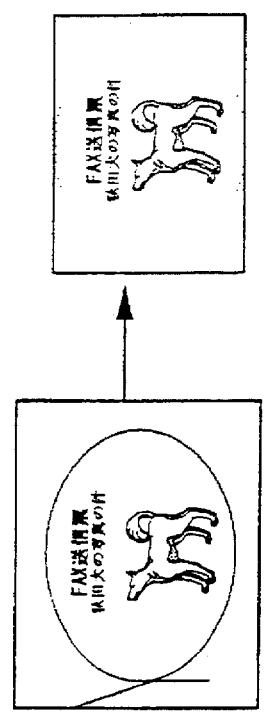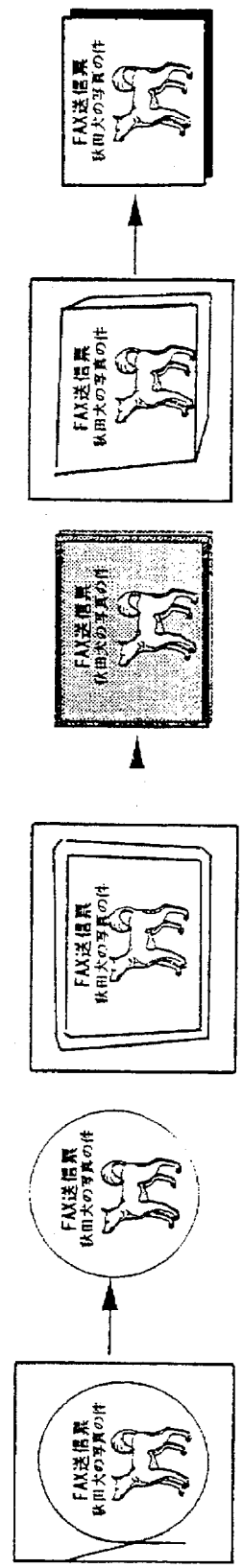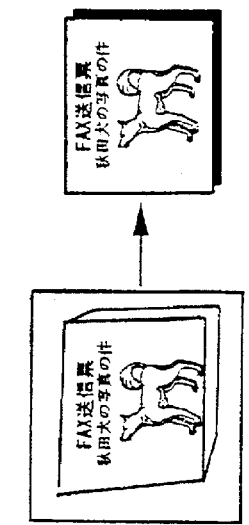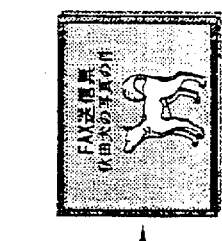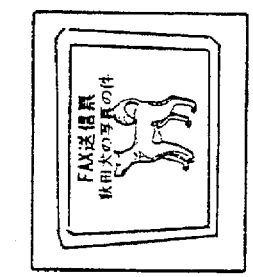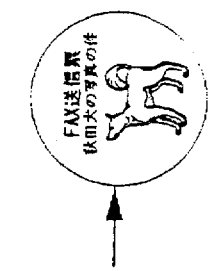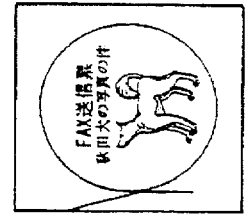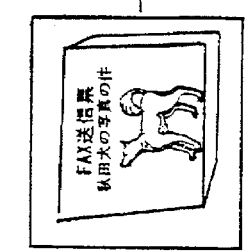

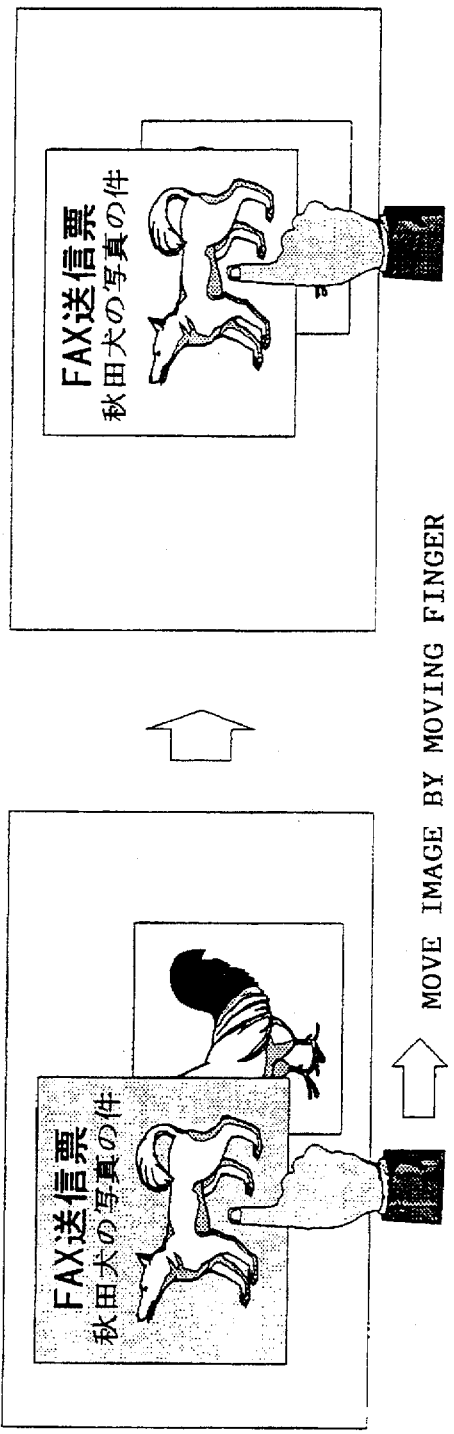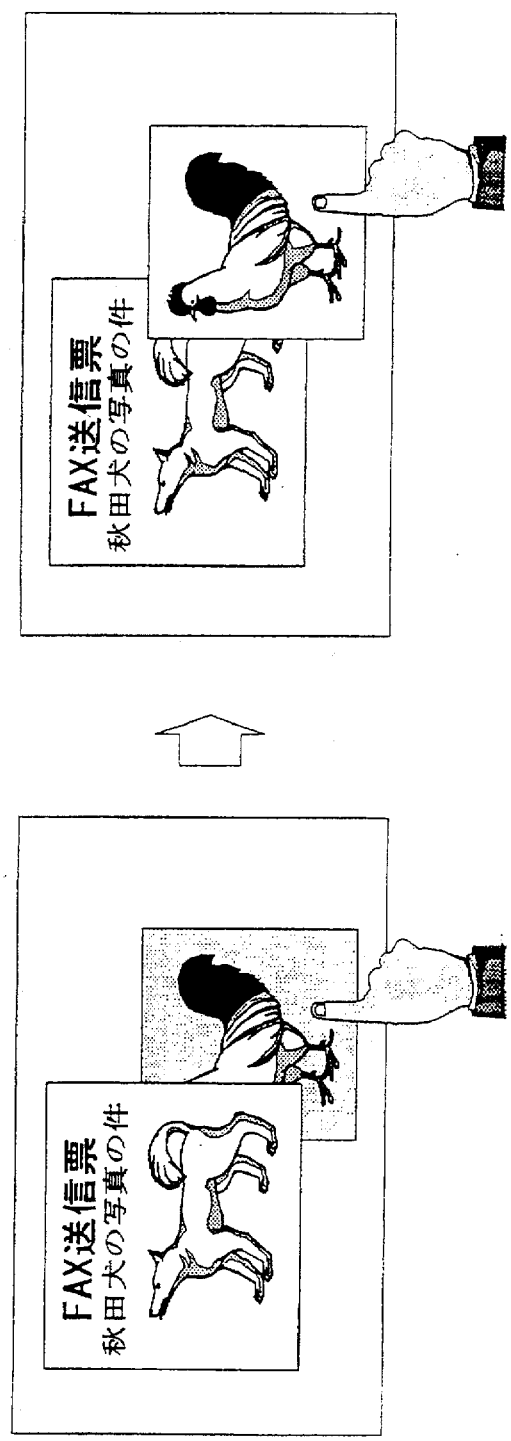
Fig. 10

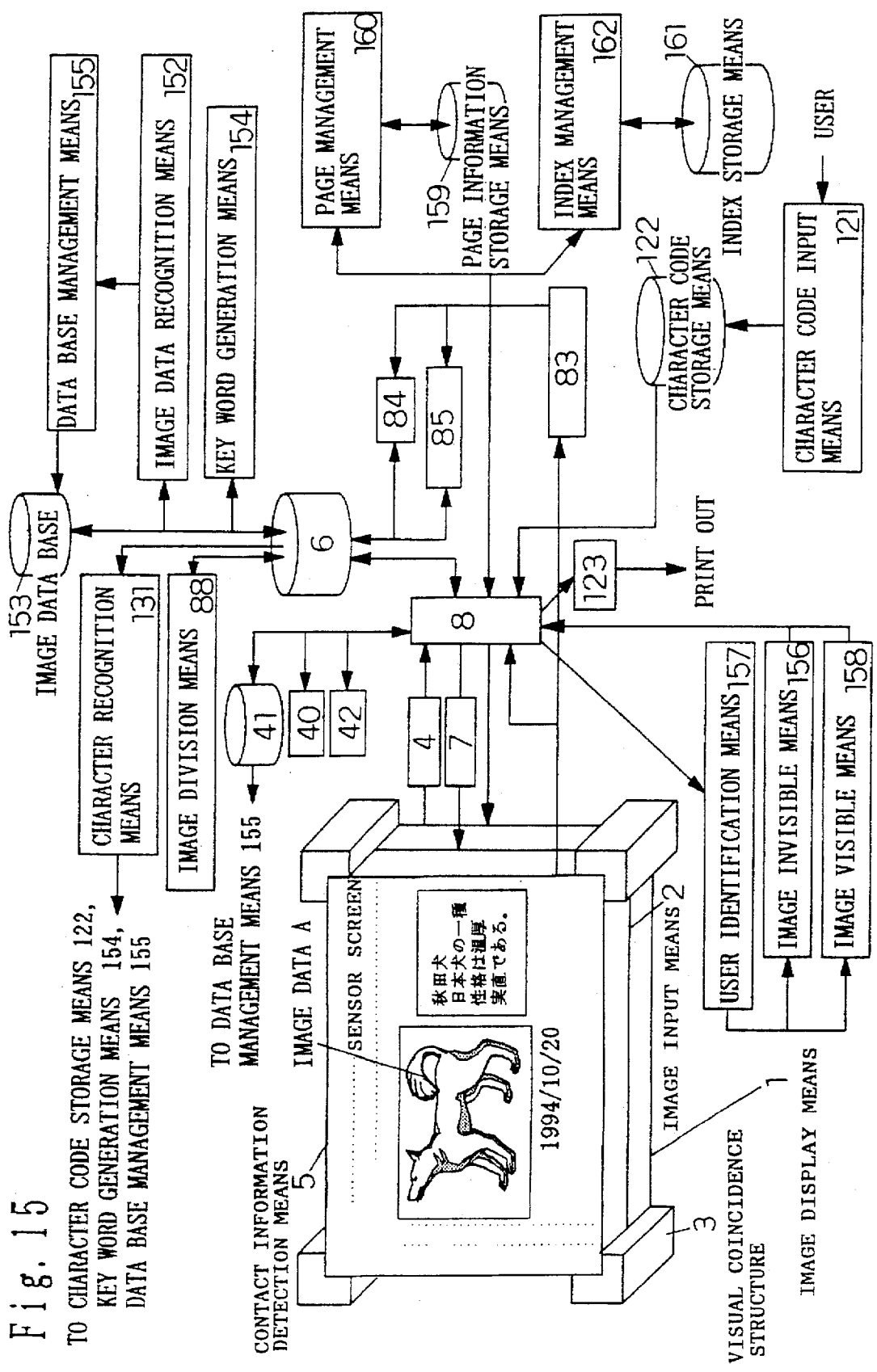

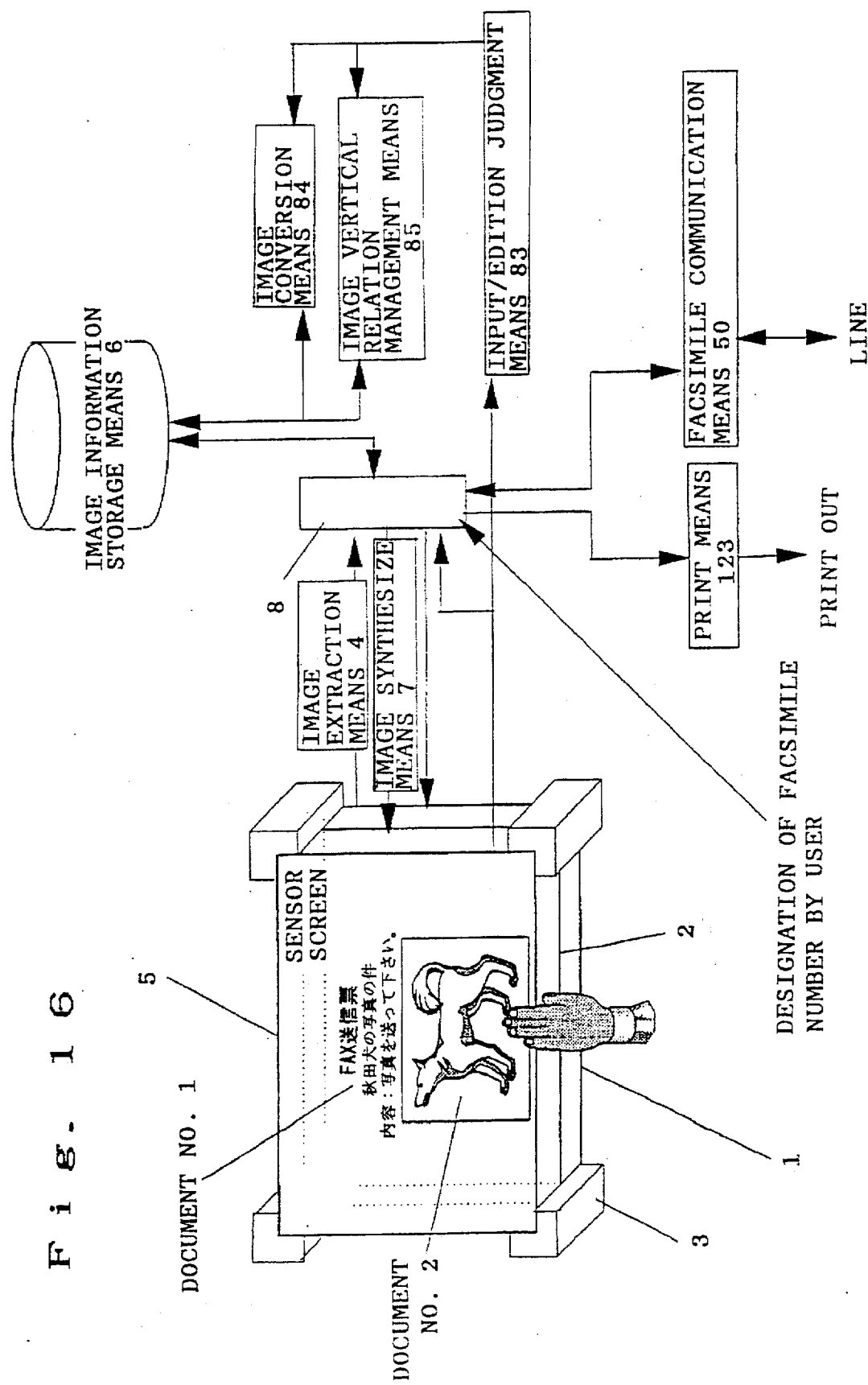

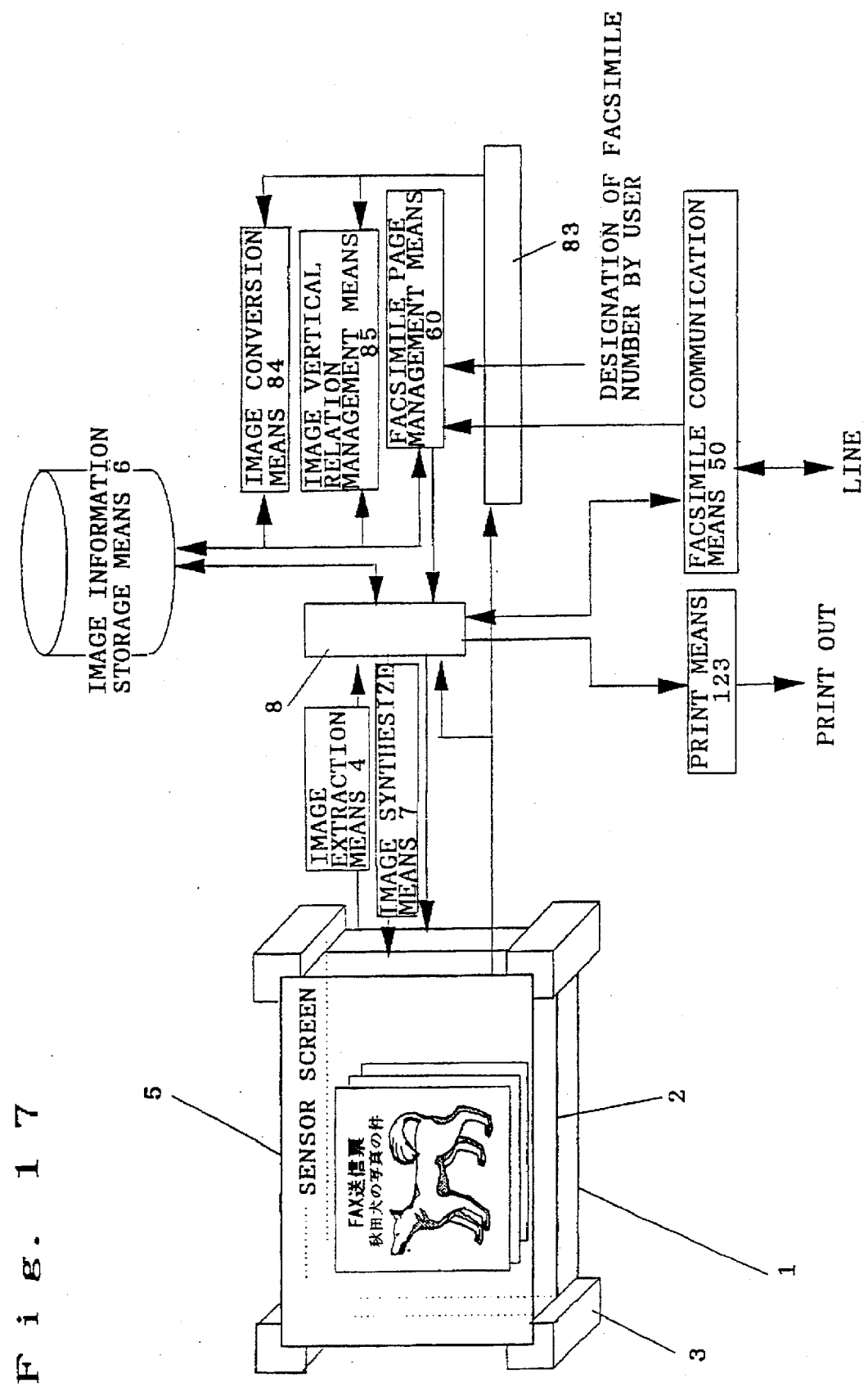

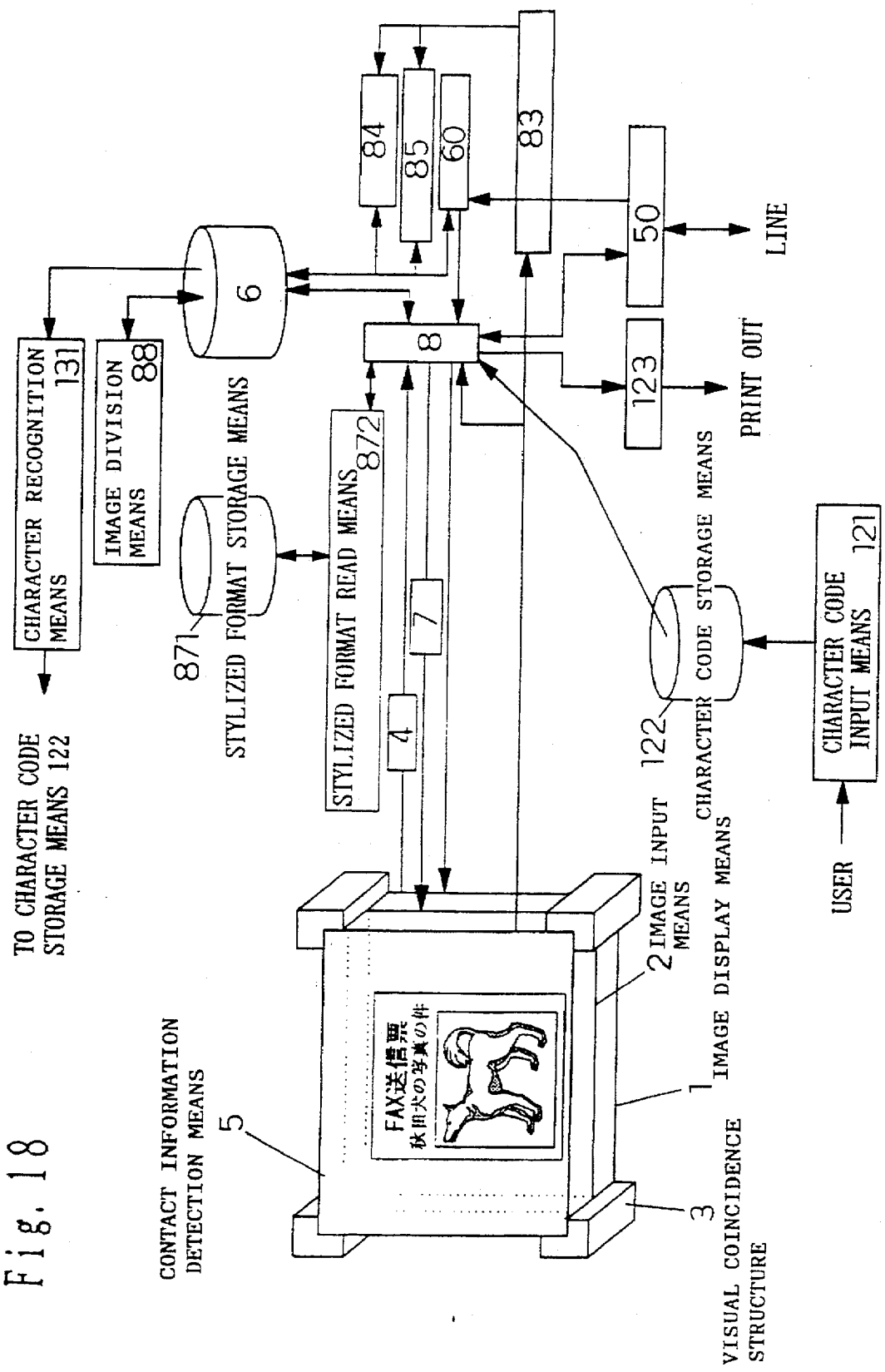

Fig.19 (1)
(2) 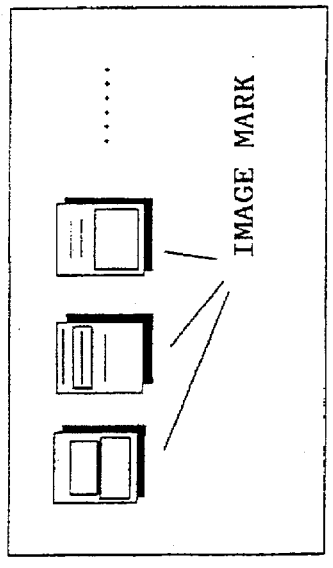
(3) 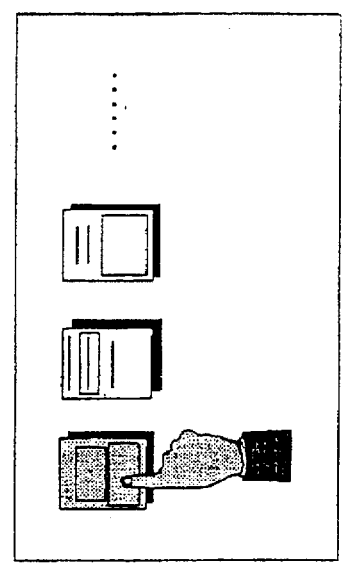

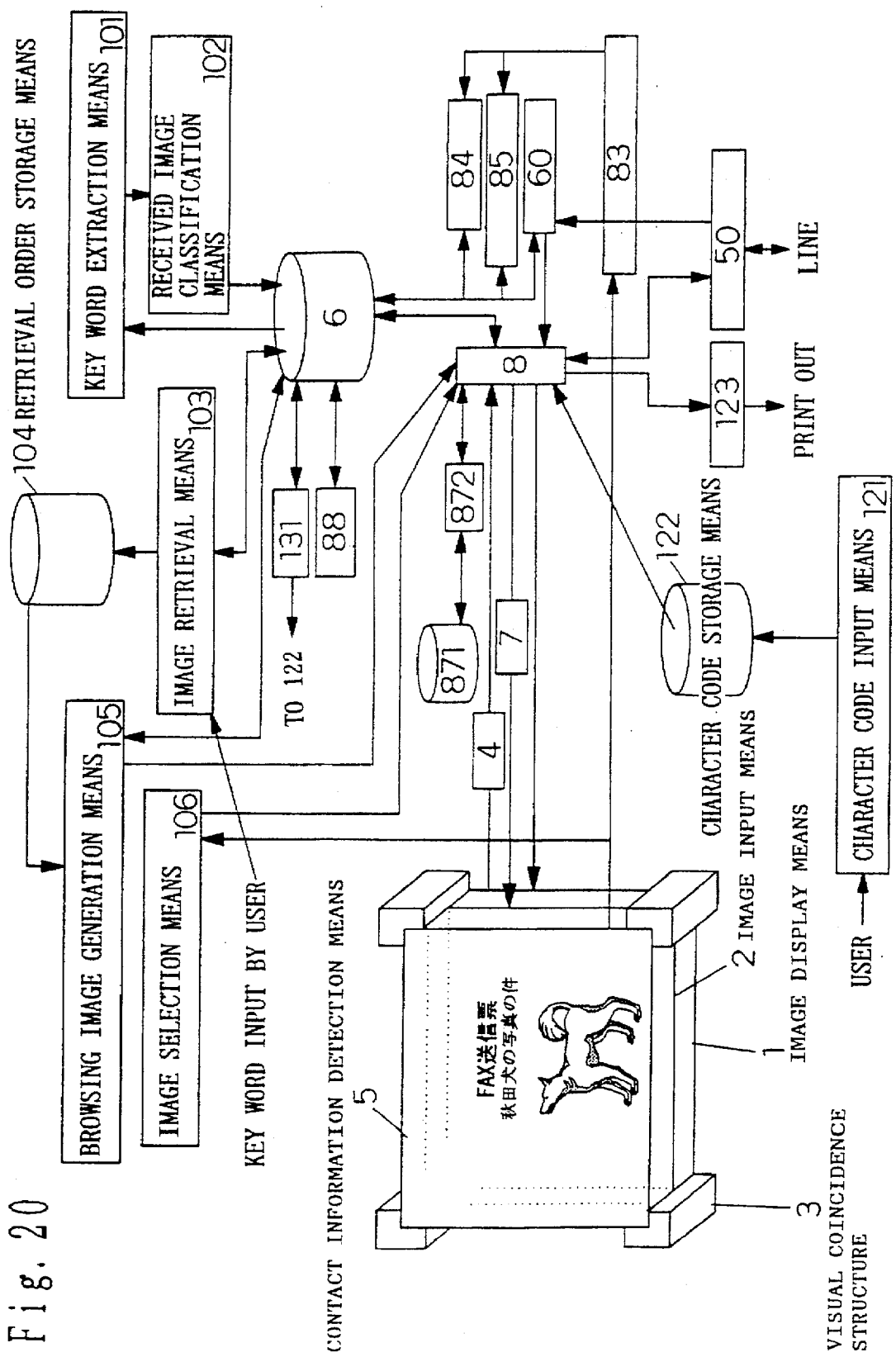

INPUT/DISPLAY INTEGRATED INFORMATION PROCESSING DEVICE

BACKGROUND OF THE INVENTION

FIELD OF THE INVENTION

The invention relates to an input/display device which is useful as an information terminal of a facsimile apparatus, a copying machine, an electronic filing apparatus, a word processor, a computer, or the like.

RELATED ART OF THE INVENTION

Conventionally, an information apparatus which handles image information, such as a facsimile apparatus, a copying machine, an electronic filing apparatus, a word processor, or a computer is assembled and used as an individual or independent apparatus. In an information terminal of a facsimile apparatus, a copying machine, an electronic filing apparatus, a word processor, a computer, or the like, functions of displaying and inputting an image are realized by a display device and an input device which are independently disposed, or a display screen and an input screen are formed at different places (sites).

As the recent advance of technology, an apparatus such as a hand-written word processor into which a character image written on a display screen with an accompanying pen can be input has been practically used.

In such a prior art apparatus, however, when an image is to be input at an information terminal of a facsimile apparatus, a copying machine, an electronic filing apparatus, a word processor, a computer, or the like, the position where the input operation is conducted is fixed, and a captured image cannot be processed or combined with another image unless the captured image is output on a display device located at another place (site), or on a paper sheet or the like. This produces problems in that the operation is cumbersome and requires a prolonged period, and that the apparatus is difficult to operate for the user who is not skilled in operation.

In a hand-written word processor, the input operation is conducted by directly writing or drawing a character or a picture on a display screen with an accompanying pen. As compared with the case where the writing or drawing operation is conducted on a paper sheet, however, the operability is poor. Moreover, such a word processor cannot handle an image which has been printed or drawn on a paper sheet. Also in the case where the input operation is conducted by using a mouse, the operability is poor, and it is difficult to write or draw a character or an image.

When pictures or documents are to be transmitted by a prior art facsimile apparatus, the user must previously edit the pictures or documents so that they appear on one paper sheet. In the case where a document is to be transmitted together with a photograph or sentences of a book or a magazine, for example, preparatory operations are required in which the photograph or sentences are copied on a paper sheet and the paper sheet is then stuck to the document. Even when a replay has simple contents, furthermore, a transmittal invoice for the replay must be prepared before the reply is to be transmitted, thereby requiring extra works. In order to read information to be transmitted, sheets bearing the information are mechanically fed into the apparatus. Therefore, only sheets of a size in a predetermined range can be used in the transmittance. When a document written on a sheet of a small size is to be transmitted, therefore, the document must previously copied to a sheet of a larger size in the predetermined range, thereby requiring extra works and causing sheets to be wasted.

The apparatus has a further problem in that image information to be transmitted cannot be checked in advance and therefore is transmitted as it is even if a read error exists in the image information.

In a word processor with a facsimile function, an image to be transmitted can be checked in advance on display means. However, the works of capturing an image printed or written on a sheet and transmitting the captured image still requires cumbersome handling works and setting operations.

SUMMARY OF THE INVENTION

In view of the above-discussed points, it is an object of the invention to provide an input/display integrated information processing device in which an image display and an image input are integrated with each other, an image captured through a display screen is displayed on the capturing place (site), thereby allowing the user to directly conduct an operation and instructions on the display screen and an input screen.

In order to attain the objects, the input/display integrated information processing device of the first aspect of the invention comprises: image display means for displaying document and image information; image input means through which information of an image such as a picture, a photograph, documents drawn or written on a sheet presented by the user can be input; a visual coincidence structure for integrally combining a display screen of the image display means with an input screen of the image input means so as to establish visual coincidence of the screens as viewed from the user; contact information detection means for, when a finger of the user, the sheet presented by the user, or the like makes contact with the contact information detection means, detecting information of a contact position, the contact information detection means being disposed on the whole of the input screen of the image input means or the display screen of the image display means; image extraction means for automatically extracting only a required portion from image information input through the image input means; image information storage means for storing the image information; image synthesize means for combining the image with an image which is already displayed and stored; and image information control means for controlling input/output operations of the image information.

In the input/display integrated information processing device of the second aspect of the invention, the image input means comprises: a line light source for illuminating a presented article on the input screen; a line optical sensor for reading one-dimensional light reflected by the presented article; sensor drive means for driving the line light source and the line optical sensor; and read control means for controlling the sensor drive means, the read control means comprising background light elimination means for, at each reading of one line, detecting image information from a difference between an output of the line optical sensor in the case where the line light source is on, and an output of the line optical sensor in the case where the line light source is off, thereby reducing a noise due to external light from illumination.

In the input/display integrated information processing device of the third aspect of the invention, the image input means further comprises an optical filter which disposed between the line light source and the line optical sensor and through which only light from the line light source is transmitted.

In the input/display integrated information processing device of the fourth aspect of the invention, the image input means further comprises scan control means for, in accordance with an output of the line optical sensor, controlling the line light source and the line optical sensor so as to scan only a portion corresponding to the sheet presented by the user.

In the input/display integrated information processing device of the fifth aspect of the invention, the image extraction means comprises: object image extraction means for extracting only a portion corresponding to the sheet presented by the user; required portion extraction means for, when the user previously draws a closed curve enclosing a required portion on the presented sheet, detecting the closed curve to extract only the required portion; and enclosure addition means for, when the user previously draws a closed curve enclosing a required portion on the presented sheet, recognizing a shape of the closed curve, and for automatically adding a suitable enclosure to an image of the required portion.

The input/display integrated information processing device of the sixth aspect of the invention further comprises: input/edition judgment means for, based on action and operation procedures exerted by the user, automatically judging whether the user intends to newly input an image or to edit a displayed image; image vertical relation management means for managing position information of vertical relations between plural images input through the image input means; and image conversion means for conducting image conversion such as positional movement, expansion, reduction, rotation and deformation on the input image.

The input/display integrated information processing device of the seventh aspect of the invention further comprises image division means for, using gray level information of an image input through the image input means, dividing the image into a character portion, a table/figure portion, and a photograph/picture portion, etc.

The input/display integrated information processing device of the eighth aspect of the invention further comprises: character code input means for inputting a character code; character code storage means for storing input character codes; and print means for printing out a stored image and/or character codes, whereby the device is provided with a word processor function.

In the input/display integrated information processing device of the ninth aspect of the invention, the character code input means comprises character recognition means for conducting a character recognition process, and a character code is input by conducting a character recognition on a character portion of an image input through the image input means.

The input/display integrated information processing device of the tenth aspect of the invention further comprises: tag generating means for generating the name of the user, an object, a date and time when image data were input through the image input means, and for generating a title of the image data, as tag information; tag storage means for storing the generated tag information; and tag management means for managing image data in accordance with tag information of the image data, whereby the device is provided with a filing function.

The input/display integrated information processing device of the eleventh aspect of the invention further comprises: image data recognition means for conducting an image recognition process on portions bearing a drawing, a photograph or a picture of image data, to encode the image data; an image database for storing image data or the coded image data; and database management means for conducting management such as registration, and retrieval on the database.

The input/display integrated information processing device of the twelfth aspect of the invention further comprises key word generation means for generating a key word for data retrieval, from tag information of image data, or codes obtained by the image data recognition means.

The input/display integrated information processing device of the thirteenth aspect of the invention further comprises: image invisible means for resorting each line of image data or enciphering image data to make the image data invisible; image visible means for restoring image data made invisible to an original state; and user identification means for matching the user with registered persons for the image data on the basis of ID information such as a password, a signature, or a fingerprint.

The input/display integrated information processing device of the fourteenth aspect of the invention further comprises facsimile communication means for conducting facsimile transmission and reception through a telephone line or the like, whereby the device is provided with a facsimile function.

The input/display integrated information processing device of the fifteenth aspect of the invention further comprises facsimile page management means for conducting a page management on images transmitted and received through a facsimile communication.

The input/display integrated information processing device of the sixteenth aspect of the invention further comprises: stylized format storage means for storing image information of a stylized format for facsimile transmission; and stylized format reading means for reading out the stylized format and for displaying it on the image display means.

The input/display integrated information processing device of the seventeenth aspect of the invention further comprises: key word extraction means for extracting a key word from a character string which has been obtained by conducting a character recognition on a received image; received image classification means for, using key word information extracted by the key word extraction means and position information of portions divided by the image division means, determining an address, a sender and contents of the received image, and for adding the determined information as tag information to the received image; received image retrieval means for reading tag information of received image information stored in the image information storage means, and for retrieving a desired received image on the basis of a key word input by the user; retrieval order storage means for storing an order of candidate images obtained by the received image retrieval means; browsing image generation means for generating a partial image of or a reduced image of the candidate images, and for displaying the generated image on the image display means in accordance with the candidate order; and image selection means for reading out image information which is selected by the user from the candidate images displayed on the image display means, from the image information storage means.

According to the first aspect of the invention, the image display means, and the image input means are visually coincident with each other. When an image is to be inputted, therefore, the user can operate the device while checking a read out image. Since the contact information detection means, and the image input means are visually coincident with each other, furthermore, an occurrence and position of a contact of a reading object can be detected so that an image of the object is immediately and automatically inputted, whereby the operation can be made simple and easy-to-understand. Furthermore, the position where an image is to be an input, and the operation method may be displayed on a display screen. Therefore, the user feels the sense of assurance, and the apparatus burden of the process of detecting the position of an image is reduced so that the process accuracy is improved. Since an image from which an unnecessary background is automatically eliminated by the image extraction means is an input to an apparatus, the burden on the operator is reduced so that the efficiency is enhanced.

According to the second aspect of the invention, each time when an image of one line is read out, the difference between the output of the optical line sensor when the line light source is on and that of the line sensor when the line light source is off is detected. Therefore, disturbance due to illumination can be eliminated.

According to the third aspect of the invention, the optical filter through which only light from the line light source is transmitted is used, and therefore a function that eliminates a disturbance due to other light can be performed in addition to that of the second aspect.

According to the fourth aspect of the invention, the device is provided with the scan control means, and hence prevented from scanning a portion where no reading object exists. Consequently, the period of the input process can be shortened so that the process efficiency is enhanced.

According to the fifth aspect of the invention, a required portion can be extracted only by enclosing the portion with a simple closed curve and using the required portion extraction means, and an enclosure corresponding to the shape of the closed curve is automatically added to the extracted image by the enclosure addition means, thereby enhancing the appearance.

According to the sixth aspect of the invention, the device is provided with the input/edition judgment means for judging whether an image is to be automatically inputted or to be subjected to an edit operation, and the image conversion means for processing an input image. Consequently, the operations of processing and editing the captured image do not require much labor and can be conducted easily.

According to the seventh aspect of the invention, the device is provided with the image division means for dividing an input image into a character portion, a table/figure portion, and a photograph/picture portion. Even when the user wishes to partly modify the layout in a later step, therefore, the user can easily select the portion to be modified.

According to the eighth aspect of the invention, the character code input means can beautify characters and the print means can print out the beautify characters and an input image. In addition to the effects of the first aspect, therefore, the device can attain a further effect that a word processor function in which an image can easily be incorporated and which has an excellent operability is realized.

According to the ninth aspect of the invention, character portions of an input image can automatically be converted into character codes and then inputted by the character recognition means. Therefore, the burden on the operator is reduced so that the efficiency is enhanced.

According to the tenth aspect of the invention, the provision of the tag generating means, the tag storage means for storing tag information, and the tag management means for managing image data in accordance with the tag information realizes a filing function in which data can easily be input and which has an excellent operability, in addition to the effects of the first aspect. Further by the tag storage means and a tag management means for instructing an image display controlling means to display the tag information on each image data, the input data and the title can be displayed with each image data, thereby to make the operator easily look at the input data or title.

According to the eleventh aspect of the invention, the device is provided with the tag storage means for storing tag information, and the tag management means for instructing the image display control means to display the tag information as a tag attached to each image data. Therefore, input information such as the date and time when the image data is input, the name of the user, and the object, and also the title of the image data can be displayed together with the image data so that the input information and the title of the image data can easily be recognized.

According to the twelfth aspect of the invention, the provision of the key word generation means removes the necessity for the user to attach tag information to data, thereby eliminating the labor of the user.

According to the thirteenth aspect of the invention, the provision of the image invisible means for making image data invisible can hide image data which must be concealed from another person. Furthermore, the provision of the image visible means for restoring image data which was made invisible to the original state, and the user identification means for matching the user with registered persons for the image data on the basis of ID information such as a password, a signature, or a fingerprint can allow only the user to see the image data, whereby the image data can be kept secret.

According to the fourteenth aspect of the invention, in addition to the effects of the first aspect, the provision of the facsimile communication means for conducting facsimile transmission and reception through a telephone line or the like can realize a facsimile function in which the edit process of an image to be transmitted is simplified, image information to be transmitted can be checked before transmission, the operation is simple, and transmission errors of a reduced number occur.

According to the fifteenth aspect of the invention, the facsimile page management means for conducting page management on inputted and received images is disposed so that, when plural pages are to be transmitted, a page to be edited is displayed on the forefront window and a page not to be edited is not displayed. Therefore, the display screen is prevented from being complicated. When plural pages are received, each of the received pages can be displayed on the image display means to be checked, and the pages can be returned to the sender after required information is inputted through the image input means into the pages, thereby improving the efficiency of the workers. Furthermore, only a required page can be printed out so that the number of wasted sheets is reduced.

According to the sixteenth aspect of the invention, the provision of the stylized format storage means for storing image information of a stylized format for transmission, and the stylized format read means for reading out the stylized format and for displaying it on the image display means allows a cover bearing the destination and the sender in a stylized format to be prepared on the spot, and to be transmitted as it is or without printing out it, thereby reducing the labor of the user and preventing sheets from being wasted.

According to the seventeenth aspect of the invention, the provision of the received image classification means for determining the sender and the contents of a received image on the basis of a result of a character recognition, and for automatically adding them as tag information allows the user to select a received image only by checking the tag information, thereby improving the efficiency of the works. Since the received image retrieval means for matching tag information with a keyword input by the user to retrieve a desired received image is disposed, the burden on the user of searching the desired received image can be reduced so that the efficiency of the works is enhanced.

BRIEF DESCRIPTION OF THE DRAWINGS

FIG. 1 is a diagram showing the configuration of an embodiment of the first aspect of the invention;

FIG. 2 (FIGS. 2a,2b) is a diagram showing the configuration of image input means of the second aspect of the invention;

FIG. 3 is a diagram showing the configuration of an optical sensor array and a scanner light source which are used in image input means of the third aspect of the invention;

FIG. 4 is a diagram showing the configuration of image extraction means of the fifth aspect of the invention;

FIG. 5 (FIGS. 5(a), 5(b) and 5(c)) is a diagram illustrating the operation of the image extraction means;

FIG. 10 (FIGS. 10(1), 10(2)) is a diagram illustrating the operation of input/edition judgment means and image vertical relation management means of the sixth aspect of the invention;

FIG. 15 is a diagram illustrating the configuration of the eleventh, twelfth and thirteenth aspects of the invention;

FIG. 16 is a diagrams illustrating the configuration of the fourteenth aspect of the invention;

FIG. 17 is a diagram showing the configuration of fifteenth aspect of the invention;

FIG. 18 is a diagram showing the configuration of sixteenth aspect of the invention;

FIG. 19 (FIGS. 19(1)–19(3)) is a diagram showing the operation of sixteenth aspect of the invention;

FIG. 20 is a diagram showing the configuration of seventeenth aspect of the invention;

PREFERRED EMBODIMENTS OF THE INVENTION

Figure 6:
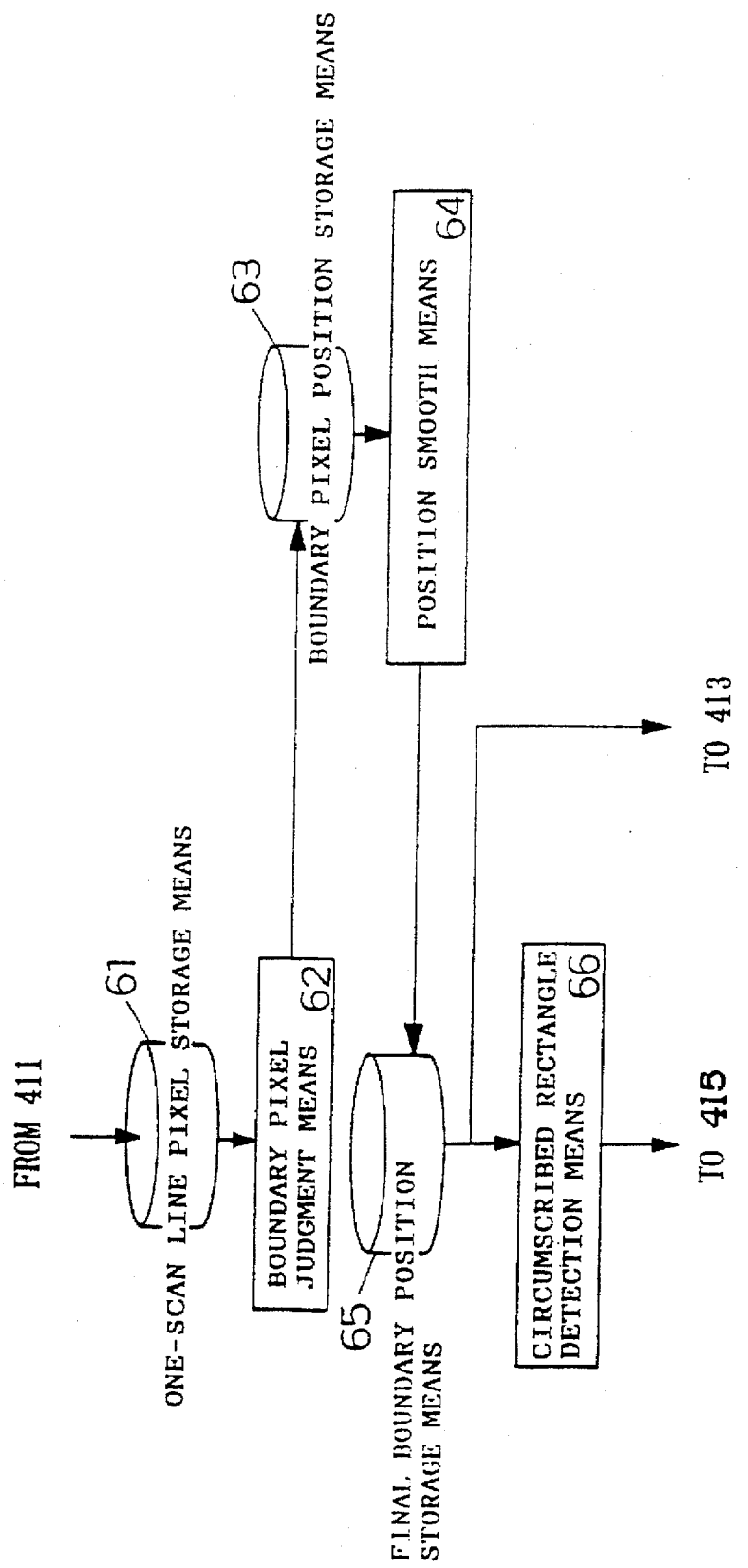
FIG. 6 is a diagram specifically showing the configuration of boundary position detection means in the image extraction means.

FIG. 1 is a diagram showing the configuration of an embodiment of the invention. In FIG. 1, 1 designates image display means, 2 designates image input means, 3 designates a visual coincidence structure, 4 designates image extraction means, 5 designates contact information detection means, 6 designates image information storage means, 7 designates image synthesize means, and 8 designates image information control means.

The image display means 1 is a display panel which consists of a liquid crystal display device, an EL display device, a cathode ray tube, or the like. The image input means 2 is an image information read panel which consists of a light source, an optical sensor, etc. The contact information detection means 5 consists of a transparent touch panel of the pressure sensitive type or the electrostatic capacity type, and detects a contact of a finger of the user or a reading object, and the position of the contact.

As shown in FIG. 1, the input screen of the image input means 2 is located by the visual coincidence structure 3 so that the input screen is opposed to the display screen of the image display means 1 and the coordinate systems of the two input screens coincide with each other. The image input means 2 may be placed before or behind the image display means 1.

First, an outline of the operation of the embodiment in the case where the user conducts an image input operation will be described. In the illustrated example, it is assumed that the image input means 2 is placed before the image display means 1.

When the user first presses a sheet against the image input means 2 while directing downward the sheet face bearing a picture or sentences, the contact information detection means 5 detects the contact position, and supplies information of the reading position and a trigger signal for the reading operation, to the image information control means 8. In response to an input from the user, the image information control means 8 sends a trigger signal for initiating the reading operation to the image input means 2. At this time, the image which is displayed on the display screen opposed to the input portion is allowed to remain displayed as it is.

The information of the position of the input portion may be previously determined. In this case, the input position may be displayed on the display screen of the image display means 1 to indicate the position to the user. This can simplify the operations such as the positioning operation.

The image input means 2 which has received the trigger signal reads out image data from the pressed sheet, and supplies them to the image extraction means 4. The image extraction means 4 extracts only the portion corresponding to the pressed sheet. The extracted image data are stored together with the position information, etc. in the image information storage means 6. At the same time, the image information control means 8 sends a trigger signal to the image display means 1 and the image synthesize means 7 so that the image data stored in the image information storage means 6 are displayed on the display screen. As shown in FIG. 1, the image synthesize means 7 which has received the signal from the image information control means 8 generates an image which is obtained by combining documents Nos. 1 and 2 with each other as if the image data are incorporated at the input position, and supplies the generated image to the image display means 1 to indicate it to the user. The outline of the operation has been described. Next the components will be described specifically.

The operation of the contact information detection means 5 will be described specifically. The contact information detection means 5 is incorporated with the device in such a manner that the screen of a touch sensor of the means (hereinafter, the screen is referred to as "the sensor screen") overlaps the input screen of the image input means 2. The contact information detection means 5 detects whether or not an article has made contact with positions of the sensor screen. The detection system is configured by using either of the optical type, the transparent conductive film (resistance film) type, the electrostatic capacity type, the pressure sensor type, etc. In accordance with the pressing force exerted when the sheet face which the user intends to be read has made contact with the sensor screen, the contact information detection means 5 supplies to the image information control means 8 a contact signal indicative of a contact between the sensor screen and an article, and position information of the range of the contacting article. When the contact signal is stable in time and position, the image information control means 8 judges that the user presses a sheet to be read against the sensor screen, and, when the signal is not stable, judges that the contact is erroneously done. If it is judged that a sheet to be read is pressed against the sensor screen, the image information control means 8 automatically sends a signal for the reading operation to the image display means 1 and the image input means 2. The points of starting and ending the image reading operation may be set to be in the range which is centered at the pressed area and larger than the pressed area by a predetermined length. Alternatively, the points are automatically determined by the image input means 2. The alternative will be described in the later description of the image input means 2.

The contact information detection means 5 may be configured so that the position of image information is detected by subjecting an input from the whole of the sensor screen to an image recognition process. In this case, the contact information detection means 5 is not required to be placed before the image display means 1 or the image input means 2.

As described above, the position of a sheet face can be detected automatically by the contact information detection means 5, and, in order to automatically capture image information, the user is requested only to press a sheet to be read out against the sensor screen. The user is not requested to, for example, press keys or buttons, and the work of sticking a sheet is replaced with the operation of reading out the sheet, resulting in that the device is clear and easy for the user to operate. In the above, the operation in the case where the image input means 2 is placed before the image display means 1 has been described. The operation in the case where the image input means 2 is placed behind the image display means 1 is the strictly same as that described above. The invention is not restricted by the positional relationship between the image display means 1 and the image input means 2. In such case the sheet is put on the surface of the display means 1.

Next the configuration and operation of the image input means 2 will be described specifically.

In the illustrated embodiment, the image input means 2 is configured by a scan type optical sensor array. FIG. 2 is a diagram showing the configuration of the image input means 2. The reference numeral 21 designates a line optical sensor, 21a designates lenses, 21b designates optical sensors, 22 designates a line light source, 23 designates sensor drive means, 24 designates read control means, 24a designates background light elimination means, and 25 designates scan control means. The image input means 2 is configured so that the intensity of light which is emitted from the line light source consisting of many LEDs or the like and reflected by a reading object as shown in FIG. 2 is measured by the line optical sensor 21, whereby the object is read as image data. The line optical sensor 21 is configured by linearly arranging pairs of the SELFOC lenses 21a and the optical sensors 21b.

As shown in FIG. 2, the focal point of each SELFOC lens 21a is set to be positioned at a sheet face placed on the surface of the transparent touch panel of the contact information detection means 5. Hereinafter, the plane constituted by focal positions of the SELFOC lenses 21a when the line optical sensor 21 conducts the scanning operation is referred to as "the input plane".

In the embodiment, the wavelength of light emitted from the scanner light source 22 may be restricted to that in the infrared region. In this case, light emitted from the scanner light source 22 cannot be sensed by the eyes of the user, and therefore the user is prevented from feeling discomfort such as "glare" due to the light emission.

FIG. 3 is a diagram showing the configuration of the line optical sensor 21 and the scanner light source 22. The reference numeral 21c designates an IR-pass filter, and 22a designates IR emitting devices.

The IR emitting devices 22a consist of IR LEDs, tungsten halogen lamps, or the like, and emit light of a wavelength in the infrared region. Light of a wavelength in the infrared region is invisible to the eyes of a human being. The light emitted from the IR emitting devices 22a is reflected and then passed through the IR-pass filter 21c to enter the optical sensors 21b. The IR-pass filter 21c allows only light of a wavelength in the infrared region to pass therethrough. Therefore, the optical sensors 21b detects only light which has been emitted from the scanner light source and reflected by the sheet face. Then, the optical sensors 21b output an electrical signal the level of which corresponds to the intensity of reflection light entering the respective sensors as described above, whereby the gray level of the sheet in the input plane position is measured. Alternatively, the IR-pass filter 21c may be positionally exchanged with the SELFOC lenses 21a. Also in the alternative, the same effects are attained.

When the image input operation is not conducted, the line optical sensor 21 always stays at a predetermined position (hereinafter, referred to as "the origin point").

The sensor drive means 23 moves the line optical sensor 21 along the scan direction. The speed of this movement (hereinafter, referred to as "the scan speed") may be determined by the user, or previously set so as to establish the equimultiple relationship. The driving operation is conducted each time when a signal from the scan control means 25 is received.

The read control means 24 controls the operation of reading out an image of one line in accordance with the signal from the scan control means 25, and also the lighting of the line light source 22. The outputs of the optical sensors 21b are processed by the background light elimination means. Furthermore, positions of pixels of the read out image information in the display screen are calculated on the basis of the given scan time and the scan speed. When the operation of reading out an image of one line is completed, a signal is issued to the scan control means 25.

In order to detect only the intensity of light reflected by the sheet face, each time when one line is read out, the background light elimination means 24a reads the difference between the outputs of the optical sensors 21b in the case where the line light source 22 is lit on, and those of the optical sensors 21b in the case where the line light source 22 is lit off, and outputs the reading result to the image extraction means 4. The background light elimination means 24a allows only light emitted from the line light source 22 to be detected, resulting in that only light reflected by the sheet face can be detected. This reduces the influence due to external light from illumination lighting the device, so as to obtain a sharper image.

The scan control means 25 sends to the sensor drive means 23 a signal corresponding to the distance along which the line optical sensor 21 is moved. When the image input operation is to be started, a signal for moving the sensor from the origin point to the starting point for the scanning operation is supplied to the sensor drive means 23. The point of starting a scan operation may be given in the form of a command by the user as described above. Alternatively, using the fact that substantially no light is generally reflected by a portion where a sheet is not placed, a definition may be given as follows: "The scan starting point is set at an instance when a zone in which all the optical sensors 21b output a signal corresponding to a black pixel fails to continue along a given distance." The starting point may be previously set.

When the line optical sensor 21 is moved to the scan starting point, a signal for the image input operation is sent to the read control means 24. During the image input operation, the signal which corresponds to the moving speed preset as described above is sent to the sensor drive means 23, and the scan control means 25 monitors the signal output from the read control means 24. When it is not judged that the sensor 21 reaches the scan ending point, a trigger signal for the reading operation is sent to the read control means 24. When it is judged that the sensor 21 reaches the scan ending point, a signal for moving the line optical sensor 21 from the current position to the origin point is sent to the sensor drive means 23, and the sensor is returned to the origin point.

The judgment on whether the sensor reaches the ending point or not may be given in the form of a command by the user as described above. Alternatively, using the fact that substantially no light is generally reflected by a portion where a sheet is not placed, a definition may be given as follows: "The scan ending point is set at an instance when a zone in which all the optical sensors 21b output a signal corresponding to a black pixel continues along a given distance." The ending point may be previously set.

When the sensor drive means 23 completes the scanning operation of the whole face of the pressed sheet as described above, the operation of reading the image is ended.

In the embodiment, the image input means 2 is configured by a scan type optical sensor array. The means may be configured by a surface sensor in which optical sensors are arranged in a plane. When a TFT liquid crystal device is used as a sensor, the image input means may be integrated with the image display means 1. Alternatively, the image input means 2 may be configured by lenses and a CCD as in the case of an image receiving portion of a camera.

In the above, the embodiment in which the image input means 2 is placed before the image display means 1 has been described. In the case where the image input means 2 is placed behind the image display means 1, the image display means 1 is placed under the contact information detection means 5, and the image display means 1 is controlled as described above so as to change the optical transmittance of the portion through which an image is input, and the focal point of each SELFOC lens 21a is formed on a sheet placed on the display screen of the image display means 1. According to this configuration, when a sheet bearing information to be transmitted is pressed against the display screen, the operation of reading an image can be conducted in the exactly same manner.

The specific configuration and operation of the image input means 2 have been described. Next, the image extraction means 4 will be described.

FIG. 4 is a diagram showing the configuration of the image extraction means 4. The reference numeral 41 designates object image extraction means, 42 designates required portion extraction means, and 43 designates enclosure addition means.

FIG. 5 is a diagram illustrating the operation of the image extraction means 4. The image which has been read out by the image input means 2 is subjected to an extraction operation in which only the portion corresponding to the pressed sheet is extracted by the object image extraction means 41 as shown in FIG. 5(a). When a closed curve enclosing sentences or a picture to be read is drawn on the sheet, the required portion extraction means 42 detects the position of the closed curve, and extracts only the required portion enclosed by the closed curve as shown in FIG. 5(b). The enclosure addition means 43 recognizes the shape of the closed curve, and adds an enclosure corresponding to the shape of the closed curve to the extracted image, thereby enhancing the appearance.

The operations of the components of the image extraction means 4 will be described specifically. As shown in FIG. 4, the object image extraction means 41 consists of image smooth means 411, boundary position decision means 412, background pixel conversion means 413, read out image storage means 414, and object image decision means 415.

The image input means 2 supplies values of the pixels to the image extraction means 4. From the pixel values supplied from image read means, the image smooth means 411 obtains an average value of pixel values of neighborhood pixels, and supplies the obtained value to the boundary position decision means 412. The pixel values supplied from the image input means 2 are sequentially supplied also to the read out image storage means 414, and stored therein.

The boundary position decision means 412 conducts a process for each scan line, and, from the received pixel values, decides the position of the boundary between the sheet face which is pressed against the input plane by the user, and the background.

The specific operation of the boundary position decision means 412 will be described with reference to FIG. 6. FIG. 6 is a diagram specifically showing the configuration of the boundary position decision means 412. The reference numeral 61 designates one-scan line pixel storage means, 62 designates boundary pixel judgment means, 63 designates boundary pixel position storage means, 64 designates position smooth means, 65 designates final boundary position storage means, and 66 designates circumscribed rectangle detection means.

The one-scan line pixel storage means 61 stores pixel values of one scan line which are supplied from the image smooth means 411. When pixel values of one scan line are input, the boundary pixel judgment means 62 then obtains the position of the boundary between the background and the object image, using the general knowledge that "a background has a higher gray level, and a peripheral portion of an object image (the vicinity of the boundary between the image and the background) has a lower gray level". The boundary pixel judgment means 62 first reads out pixel values from the one-scan line pixel storage means 61 in the sequence directed from the starting point of the scan line toward the ending point, and judges the initial pixel position x which satisfies the rule indicated by expression 1 below, to be an upper boundary position between the background and the object image. The position information of the pixel position is supplied to the boundary pixel position storage means 63. When the pixel value indicates the brightness, the relationship is inverted.

$$"p(x) > th \text{ and } p(x+1) \leq th" \quad (1)$$

where p(x) indicates the pixel value (threshold) at a pixel position x, and th indicates a predetermined arbitrary value. Next, the boundary pixel judgment means 62 searches the boundary position in a similar manner in the sequence directed from the ending point of the scan line toward the starting point, and judges the initial pixel position which satisfies expression 1 above, to be a lower boundary position. The position information of the pixel position is supplied to the boundary pixel position storage means 63.

The boundary pixel position storage means 63 stores position information of the upper and lower boundary positions of each scan line which is sent from the boundary pixel judgment means 62.

The position smooth means 64 reads out position information of the boundary between the background and the object image which is stored in the boundary pixel position storage means 63. Among pixel positions which are adjacent to the pixel position in question along the main scan direction of the image read means, a middle point of pixels which are close to each other in position is obtained as the final boundary position, and supplied to the final boundary position storage means 65. The position smoothing reduces the influence of variation in the boundary position due to a noise, so that a smooth boundary is obtained. Next, the position smoothing along the subscan direction is conducted in the same manner, and the result is supplied to the final boundary position storage means 65.

The final boundary position storage means 65 stores position information of the final boundary positions sent from the position smooth means 64.

The circumscribed rectangle detection means 66 reads out the coordinate positions from the final boundary position storage means 65, and detects the maximum and minimum values with respect to the main scan direction of the image input means 2, and those with respect to the subscan direction, as position information of a circumscribed rectangle of the object image.

In this way, the boundary position decision means 412 obtains the boundary position between the object image and the background, and the position of the circumscribed rectangle which encloses the object image.

The background pixel conversion means 413 reads out information of boundary coordinates from the final boundary position storage means 65. On the basis of the position information of the circumscribed rectangle detected by the circumscribed rectangle detection means 66, the gray levels of pixels corresponding to pixels between the sides of the circumscribed rectangle and the boundary coordinates, and among the pixels stored in the read out image storage means 414 are converted to a value p which satisfies expression 2, thereby eliminating the background in the circumscribed rectangle.

$$0 \leq p \leq th \quad (2)$$

From the images stored in the read out image storage means 414, the object image decision means 415 reads out the image of the portion enclosed by the circumscribed rectangle sent from the circumscribed rectangle detection means 66, and supplies the image as the object image to the image information control means 8, and the required portion extraction means 42.

As a result, the object image extraction means 41 enables an extra background portion to be automatically eliminated as shown in FIG. 5(a), thereby extracting the portion corresponding to the pressed sheet. Therefore, works of eliminating extra portions in a later step are not necessary.

The image output from the object image decision means is supplied to the image information control means 8 which in turn controls the image information storage means 6 so as to store the image as image information of the whole face of the pressed sheet, and the object image.

Next, the operation of the required portion extraction means 42 will be described with reference to FIG. 4. As shown in FIG. 4, the required portion extraction means 42 consists of extreme point detection means 421, closed curve trace means 422, closed curve position storage means 423, and internal image extraction means 424.

The extreme point detection means 421 sequentially scans the object image with starting from an end, and sets the first point of a black pixel which is larger than a given size and adjacent to the white background, as an extreme point of the closed curve. The extreme point detection means 421 outputs position information of the extreme point.

The closed curve trace means 422 scans pixels in the vicinity with starting the extreme point of the closed curve in a given rotation direction, and detects in sequence boundary points which are black pixels initially found and adjacent to the white background. The closed curve trace means 422 outputs position information of the detected boundary points, as the closed curve position. When the scan returns to the starting point, the scan operation is ended. The closed curve position storage means 423 stores position information supplied from the extreme point detection means, and the closed curve trace means.

In order to read out only image information inside the closed curve as the internal image, the internal image extraction means 424 sends the position information stored in the closed curve position storage means 423 to the image information control means 8. In accordance with the information supplied from the internal image extraction means 424, the image information control means 8 reads out image information of the internal image, and sends it to the image display means. In this way, only a required portion can be extracted by conducting a simple work in which sentences or a picture which the user intends to be transmitted is enclosed by a curve by means of the required portion extraction means 42. In other words, works in which a required portion is clipped from the sheet with scissors, a cutter or the like, or extra portions are erased after a reading operation can be eliminated so that the process efficiency is enhanced.

Figure 7:
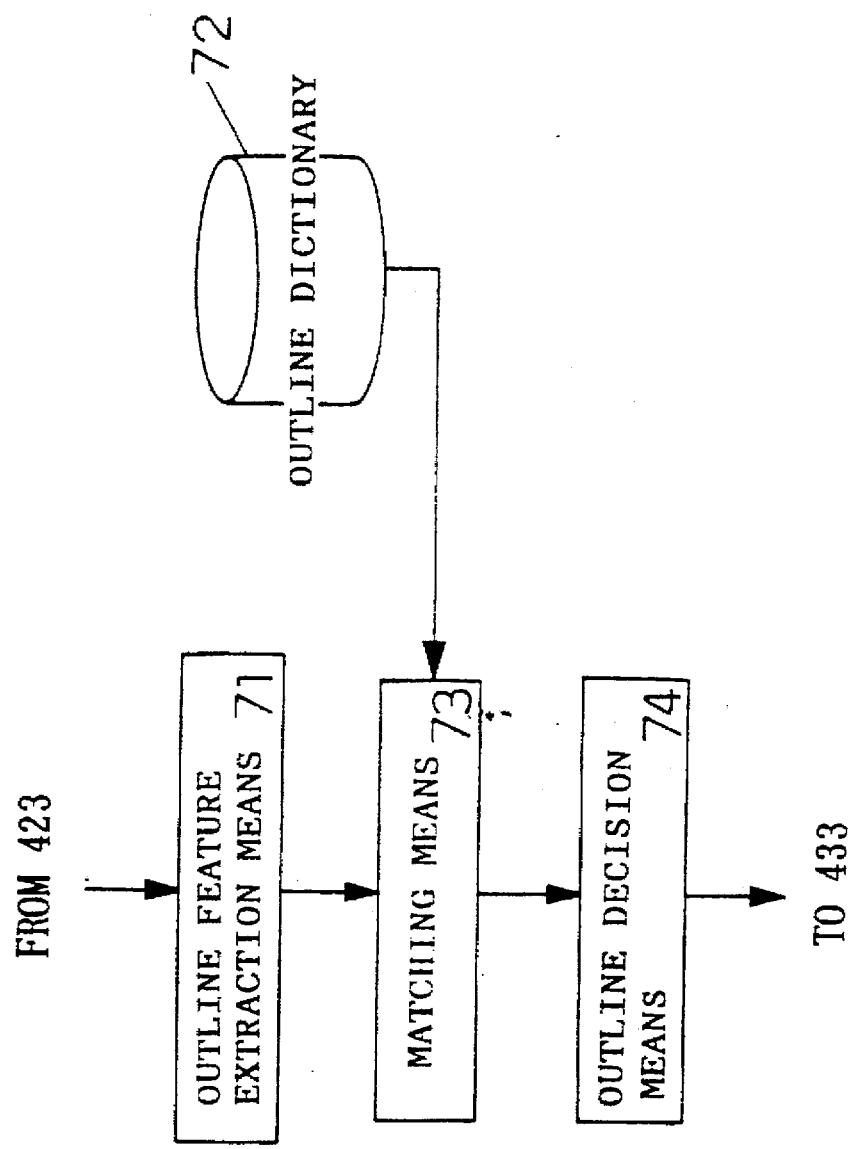
FIG. 7 is a diagram showing the configuration of outline recognition means 431 in the image extraction means.

Next, the operation of the enclosure addition means 43 will be described specifically with reference to FIGS. 4 and 7. As shown in FIG. 4, the enclosure addition means 43 consists of outline recognition means 431, outline image storage means 432, and enclosure synthesized image generation means 433.

First, the outline recognition means 431 judges the shape of the closed curve, or whether the closed curve is circular, or rectangular or has another shape. FIG. 7 is a diagram showing the configuration of the outline recognition means 431. The reference numeral 71 designates outline feature extraction means, 72 designates an outline dictionary, 73 designates matching means, and 74 designates outline decision means.

The outline feature extraction means 71 sequentially reads out position information from the closed curve position storage means 423, starting from the extreme point, and calculates values which are obtained by normalizing ratios of variations of points in the x- and y-axis directions with the whole length. The calculated values are output as outline feature amounts to a matching means 73. The outline dictionary 72 stores outline feature amount information of standard shapes such as a circle, an ellipse, and a quadrilateral. The matching means 73 portion obtains square errors of the feature amounts supplied from the outline feature extraction means 71, and the outline feature amounts of the standard shapes stored in the outline dictionary, and supplies the values to the outline decision means 74.

The outline decision means 74 judges the standard shape which produces the smallest error, to be the outline of the closed curve, and further checks whether or not a line segment exists in the vicinity of each side. Finally, the outline decision means 74 decides the enclosure to which the closed curve corresponds. The outline image storage means 432 stores image information of the enclosures of the closed curve corresponding to the standard shapes.

The enclosure synthesized image generation means 433 first reads out image information of the standard enclosures corresponding to the outlines decided by the outline recognition means 431, from the outline image storage means 432, and then image information of the image (internal image) extracted by the required portion extraction means 42, from the image information storage means 6. Finally, the enclosure synthesized image generation means 433 combines the read out internal image with the enclosure images as shown in FIG. 5(c), to generate a final enclosed image. The generated image is again supplied to the image information control means 8. As described above, the enclosure addition means produces an excellent effect that the user is required only to conduct a simple work in which sentences or a picture to be transmitted are enclosed by a curve, in order to add an enclosure complying with the closed curve, thereby enhancing the appearance.

Figure 8:
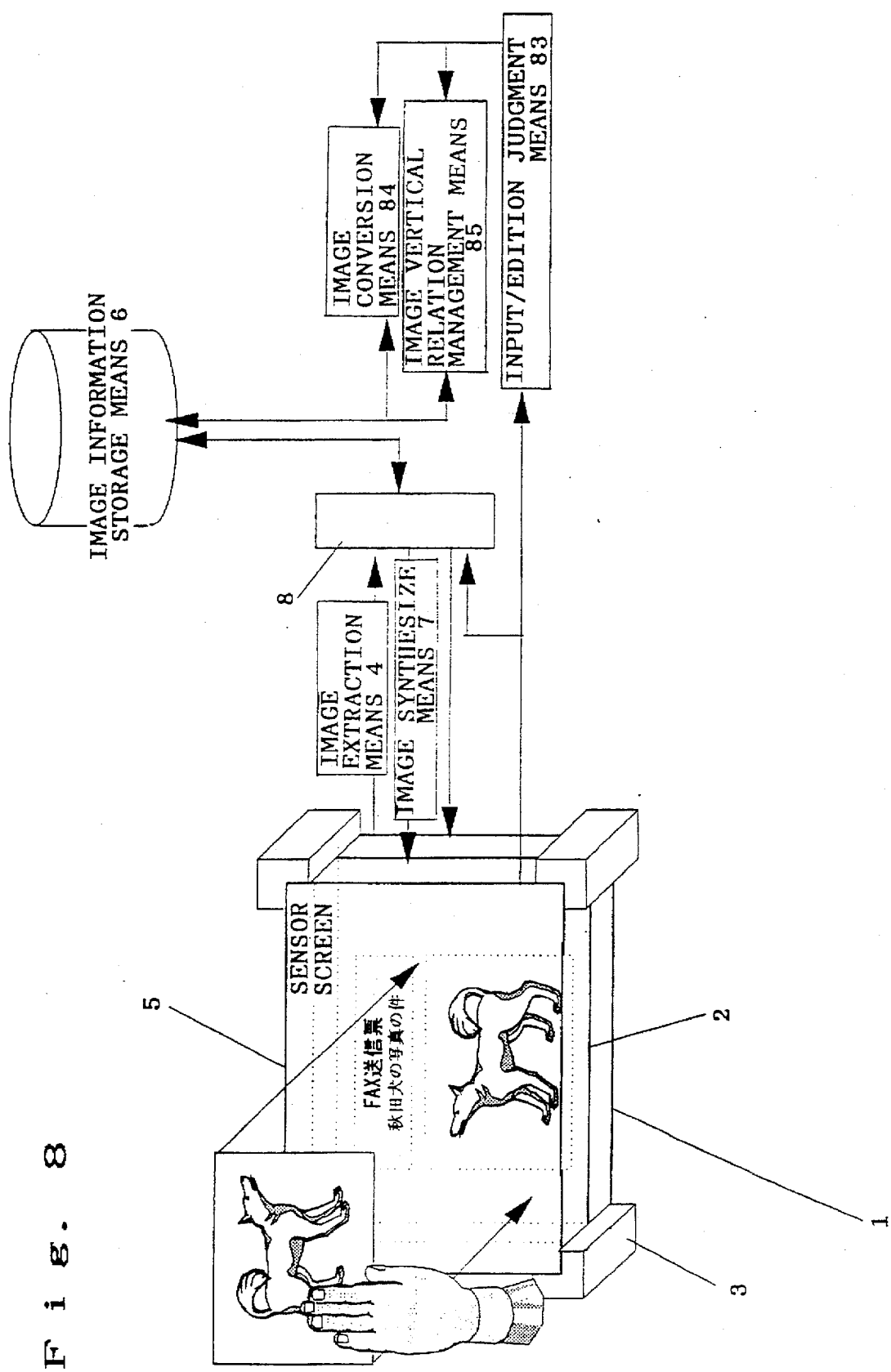
FIG. 8 is a diagram showing the configuration of an embodiment of the sixth aspect of the invention.

FIG. 8 is a diagram showing the configuration of a second embodiment of the invention. The reference numeral 83 designates input/edition judgment means, 84 designates image conversion means, and 85 designates image vertical relation management means.

The specific operation of the embodiment in the case where the user can directly touch a displayed image to edit it will be described.

When the user touches the sensor screen of the contact information detection means 5, the input/edition judgment means 83 judges whether the touch is conducted with the intention of inputting an image or with the intention of editing the currently displayed image. This judgment is done on the basis of information of the contact position and the temporal variation of the position. The information is supplied from the contact information detection means 5. The judgment criterion will be described below.

The judgment that the touch is conducted with the intention of inputting an image is done when "no currently displayed image exists at the contact position" and "the contact position is stable for a given period". In contrast, the judgment that the touch is conducted with the intention of editing an image is done when "a currently displayed image exists at the contact position" and "the contact position is stable for a given period". When the contact position is not stable in time, it is judged that the contact is an erroneous one, and nothing is done.

Figure 9:
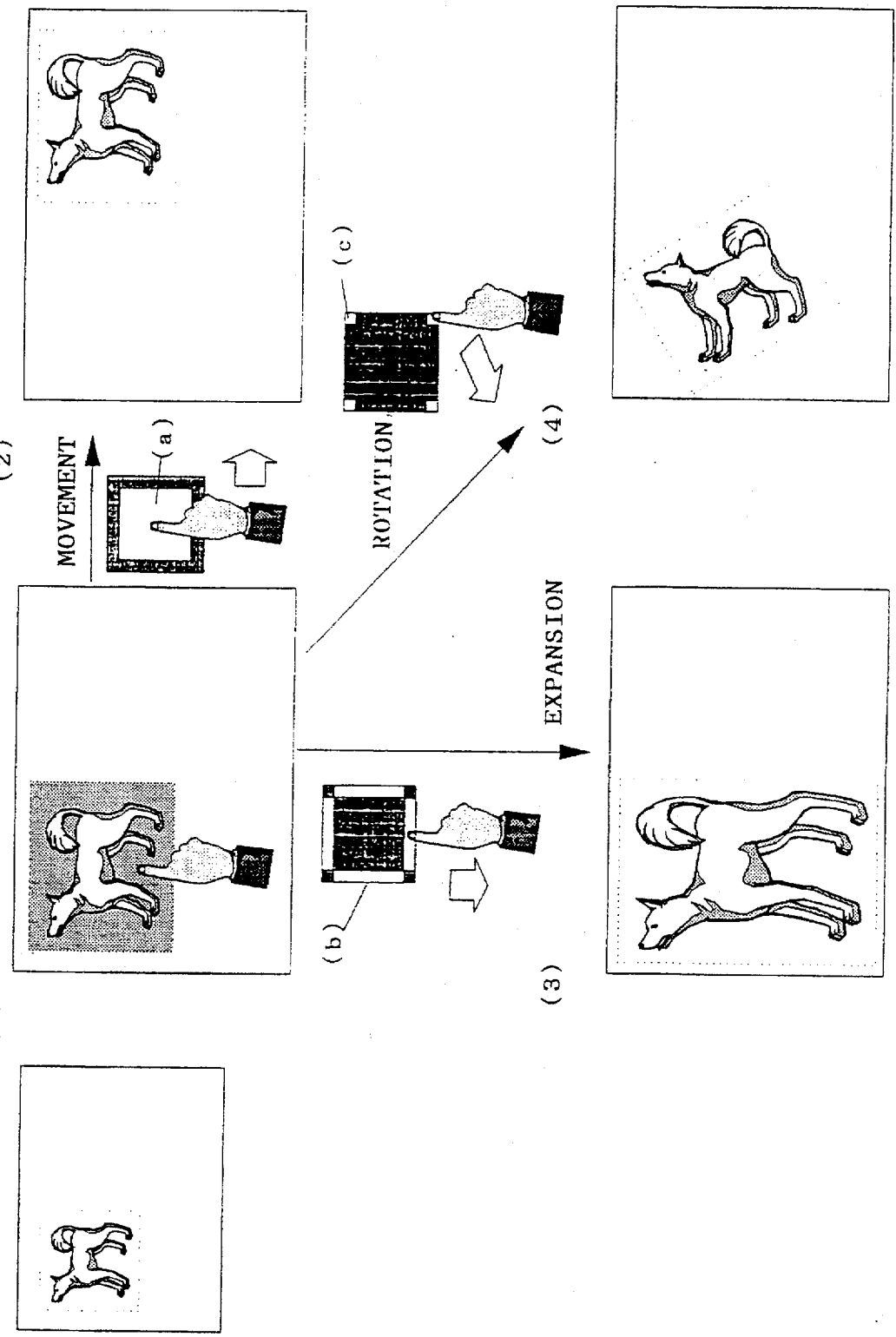
FIG. 9 (FIGS. 9(1)–9(4)) is a diagram illustrating the operation of the sixth aspect of the invention.

FIG. 9 is a diagram illustrating the operation of editing an image which has been input and is currently displayed and does not overlap with another image. First, the user touches the displayed object image which is to be edited. At this time, as described above, the input/edition judgment means 83 automatically judges that the image is to be edited, and conducts display operations in order to notify the user of the image of the current edit object. As shown in FIG. 9(1), for example, the displayed image is reversed or blinked or the display color is changed. The input/edition judgment means 83 issues a trigger signal for the editing operation to the image conversion means 84.

In response to the signal from the input/edition judgment means 83, the image conversion means 84 conducts the affine transformation or the like on the displayed image to deform the image, and, on the basis of the result, changes the image information of the object image stored in the image information storage means 6. The image conversion process is ended when the user stops touching the sensor screen of the contact information detection means 5. The user is informed of the end of the process by stopping the display operation indicative of the selection.

The kind of the deformation such as movement, or rotation of the image is automatically decided in accordance with the contact information supplied from the contact information detection means 5, as shown in (2) to (4) of FIG. 9. When the user touches portion (a) which is in the center area of the object image as shown FIG. 9(2) and moves the contact portion, for example, the object image is moved. When the user touches portion (b) which is in the peripheral area of the object image as shown FIG. 9(3) and moves the contact portion, the object image is reduced or expanded. When the user touches portion (c) which is in the vertex area of the object image as shown FIG. 9(4) and moves the contact portion, the object image is rotated about the vertex opposing the contacted vertex. Although not shown, the selection of either of the above-mentioned movement, expansion/reduction, and rotation is displayed on the image display means 1 by means of reversing the display of the selection portion, displaying a mark or characters, or changing the display color, thereby informing the user of the selection. This enables the user to feel the sense of assurance, and prevents the user from erroneously operating the device.

As a result of the above-mentioned image input and editing operations, plural images may overlap with each other. The image vertical relation management means 85 manages the vertical relation by adding to an input image a hierarchical label indicative of the hierarchy. Next, with reference to FIG. 10, the operations of the input/edition judgment means 83, and the image vertical relation management means 85 which are conducted in an editing operation in the case where an image of the edit object overlaps with another image will be described.

First, the image vertical relation management means 85 adds hierarchical labels to image information stored in the image information storage means 6, in such a manner that a newly input image is in the uppermost hierarchy.

In the case where plural images overlap with each other, when the user touches the image in the uppermost hierarchy as shown in FIG. 10(1), the input/edition judgment means 83 sends the trigger signal for the editing operation to the image conversion means 84 as described above, and the image is moved or deformed. In contrast, when the user touch an image in a lower hierarchy, the input/edition judgment means 83 sends to the image vertical relation management means 85 a signal instructing it to transfer the image to the uppermost hierarchy. The image vertical relation management means 85 which has received the signal from the input/edition judgment means 83 changes the hierarchical labels of the image information stored in the image information storage means 6, in such a manner that the object image is in the uppermost hierarchy. The image display means 1 changes the display so that the object image is displayed at the top level as shown in FIG. 10(2). The process is then completed.

In the embodiment, the input/edition judgment means 83 judges the input or editing operation on the basis of the contact information. Alternatively, this judgment is conducted on the basis of another information. For example, the input and editing operations may be switched by pressing a button or the like, or the judgment may be conducted on the basis of a voice of the user.

As described above, according to the invention, the operations of processing and editing the captured image can be conducted by directly touching the display screen, and hence the operation which is intuitively understood and does not require cumbersome works can be realized. Furthermore, sheets are prevented from being wastefully consumed.

Figure 11:
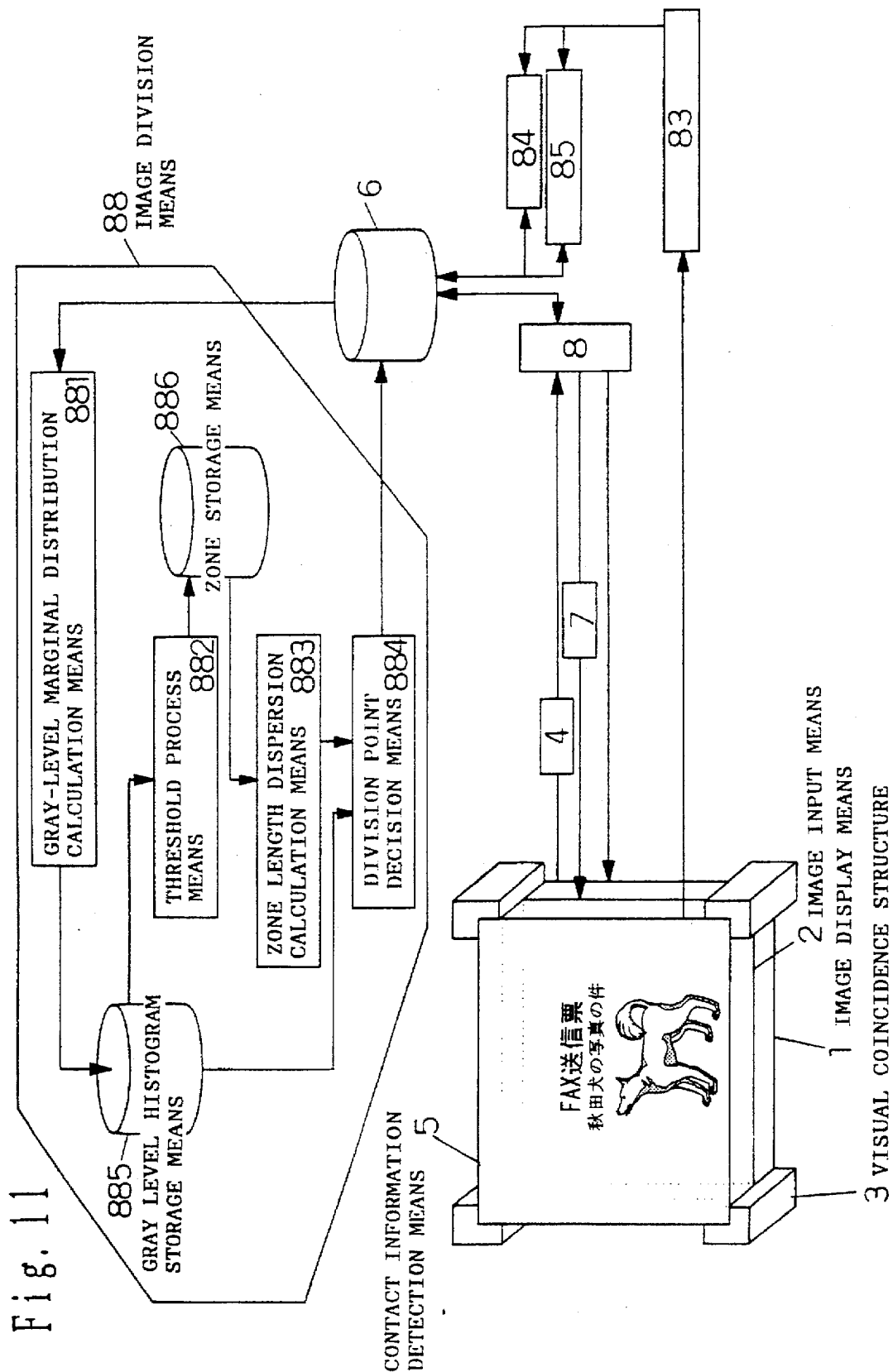
FIG. 11 is a diagram showing the configuration of an embodiment of the seventh aspect of the invention.

FIG. 11 is a diagram showing the configuration of a third embodiment of the invention. The reference numeral 88 designates image division means, 881 designates gray-level marginal distribution calculation means, 882 designates threshold process means, 883 designates zone length dispersion calculation means, 884 designates division point decision means, 885 designates gray level histogram storage means, and 886 designates zone storage means. The image division means 88 divides an image into portions such as a character portion, a picture/photograph portion, and a graph/table portion, on the basis of properties such as "a character string generally elongates along one direction", "a picture or a photograph generally has plural gray levels", and "a graph or a drawing has a large blank area". The operation of the image division means 88 will be described.

The gray-level marginal distribution calculation means 881 reads out the position information and gray level information of pixels stored in the image information storage means 6, and calculates the distribution of pixel numbers of each gray level which are counted along the horizontal direction (hereinafter, the distribution is referred to as "horizontal gray level histogram"), and the distribution of pixel numbers which are counted along the vertical direction (hereinafter, the distribution is referred to as "vertical gray level histogram"). The calculation results are supplied to the gray level histogram storage means 885.

The threshold process means 882 reads out the horizontal and vertical gray level histograms stored in the gray level histogram storage means 885, conducts the threshold operation on the histograms with using a preset value to divide them into plural zones, and supplies position information of the zones to the zone storage means 886. The zone storage means 886 stores the incoming position information of the zones.

The zone length dispersion calculation means 883 reads out the position information of the zones stored in the zone storage means 886, and calculates the lengths of the zones. Thereafter, the means 883 calculates the dispersion degrees of the zone lengths for each combination of continuous zones, and supplies the calculation results to the division point decision means 884.

The division point decision means 884 reads out the position information of the zones stored in the gray level histogram storage means 885, and the zone storage means 886. On the basis of the gray level information, the position information, and the dispersion degrees of the zone lengths for each combination of continuous zones which are supplied from the zone length dispersion calculation means 883, thereafter, the division point decision means 884 judges "a zone portion which has a larger area of a higher gray level (black) and a small dispersion degree of the zone lengths, to be a character string portion", "a zone portion which has a larger area of a lower gray level (white) and a large dispersion degree of the zone lengths, to be a drawing/table portion", and "a zone portion which has a larger area of an intermediate gray level (gray) and a small dispersion degree of the zone lengths, to be a picture/photograph portion". The boundary points of the portions are set as division points. Finally, the image information of the object image stored in the image information storage means 6 are divided into portions, and attribute labels indicative of the kind of the portion (i.e., a character portion, or a picture/photograph portion) are added to the portions, and the contents of the image information storage means 6 are changed.

In this way, the image division means 88 divides an input image into portions with respect to the attributes. When the user wishes to input and edit an image, therefore, the user is allowed to separately edit characters and a picture even if the characters and the picture mixedly exist. This eliminates the necessity of previously inputting the characters and the picture in a separate manner, thereby reducing the burden of the user. Alternatively, the user may draw a line by a finger on the sensor screen of the contact information detection means 5 to directly input position information of the division point into the division point decision means 884 so that characters and a picture are separated from each other.

Figure 12:
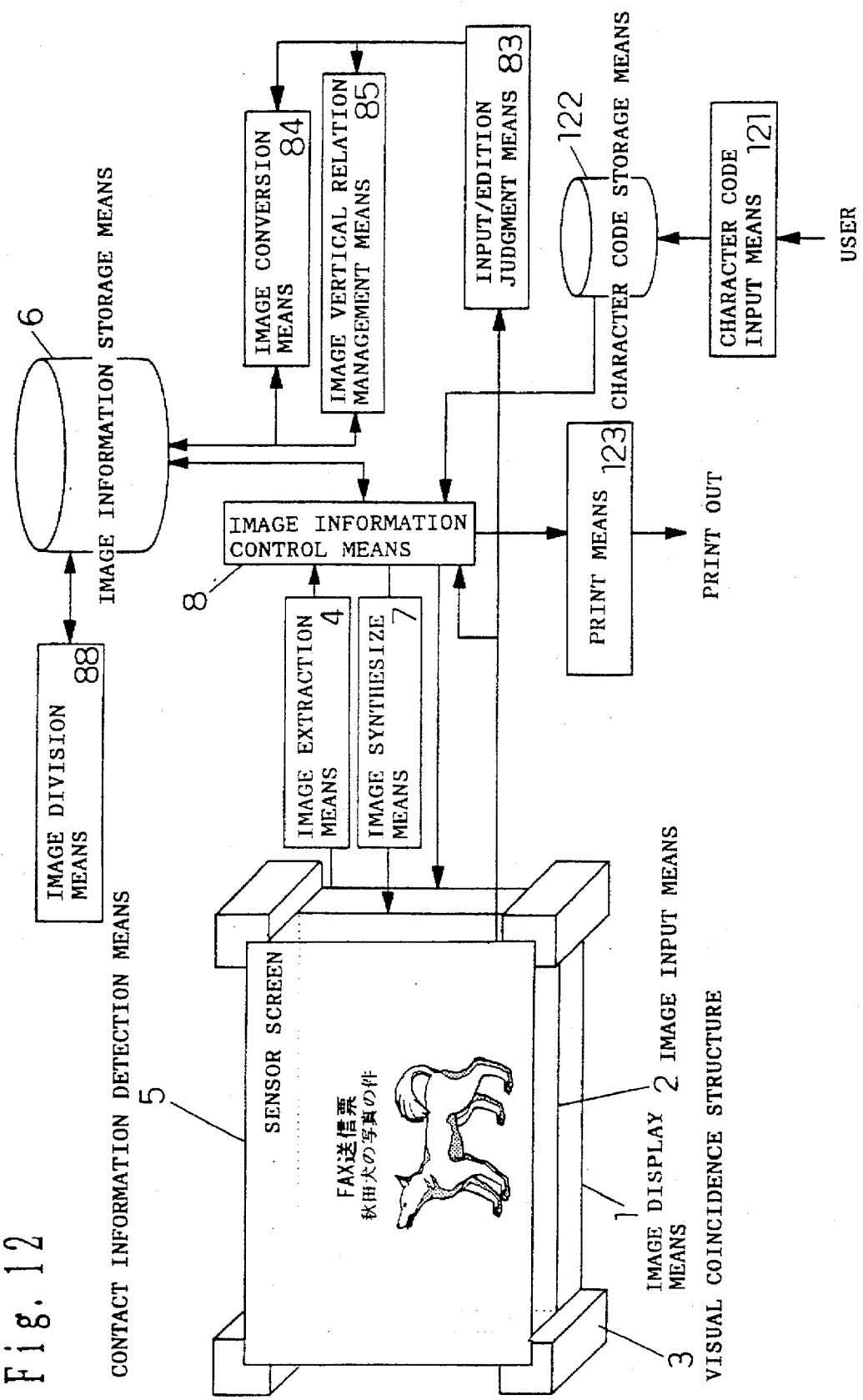
FIG. 12 is a diagram showing the configuration of an embodiment of the eighth aspect of the invention.

FIG. 12 is a diagram showing the configuration of a fourth embodiment of the invention. The reference numeral 121 designates character code input means, 122 designates character code storage means, and 123 designates print means.

The character code input means 121 supplies codes of characters and/or symbols which the user intends to be input, to the character code storage means 122 which stores input character codes together with the input positions, styles, and pages. When the user wishes to print out an input picture or characters, a command input by the user is sent to the image information control means 8. The image information control means 8 reads out information of character codes of the page which the user intends to be printed out, from the character code storage means 122, and supplies the information to the print means 123. Also, the image information control means 8 supplies corresponding one from the image information stored in the image information storage means 6, to the print means 123. In accordance with incoming information of character codes and image information, the print means 123 conducts the printing operation, whereby the device is provided with a word processor function by which the user is allowed to print out beautified characters together with image information. Therefore, a picture image can easily be incorporated into sentences, and the editing operation can easily be conducted by means of a touch operation exerted by a hand. In contrast to the operation of incorporating a picture image by using a mouse or a light pen, the operation of incorporating a picture image can be done by using a sheet and a pencil which are usually employed, so that a satisfactorily-drawn picture is easily input. When a sheet bearing a picture is cut with scissors or the like, it is possible to adjust the size of the image to be incorporated, thereby providing an operability with feeling of cut-and-paste.

Figure 13:
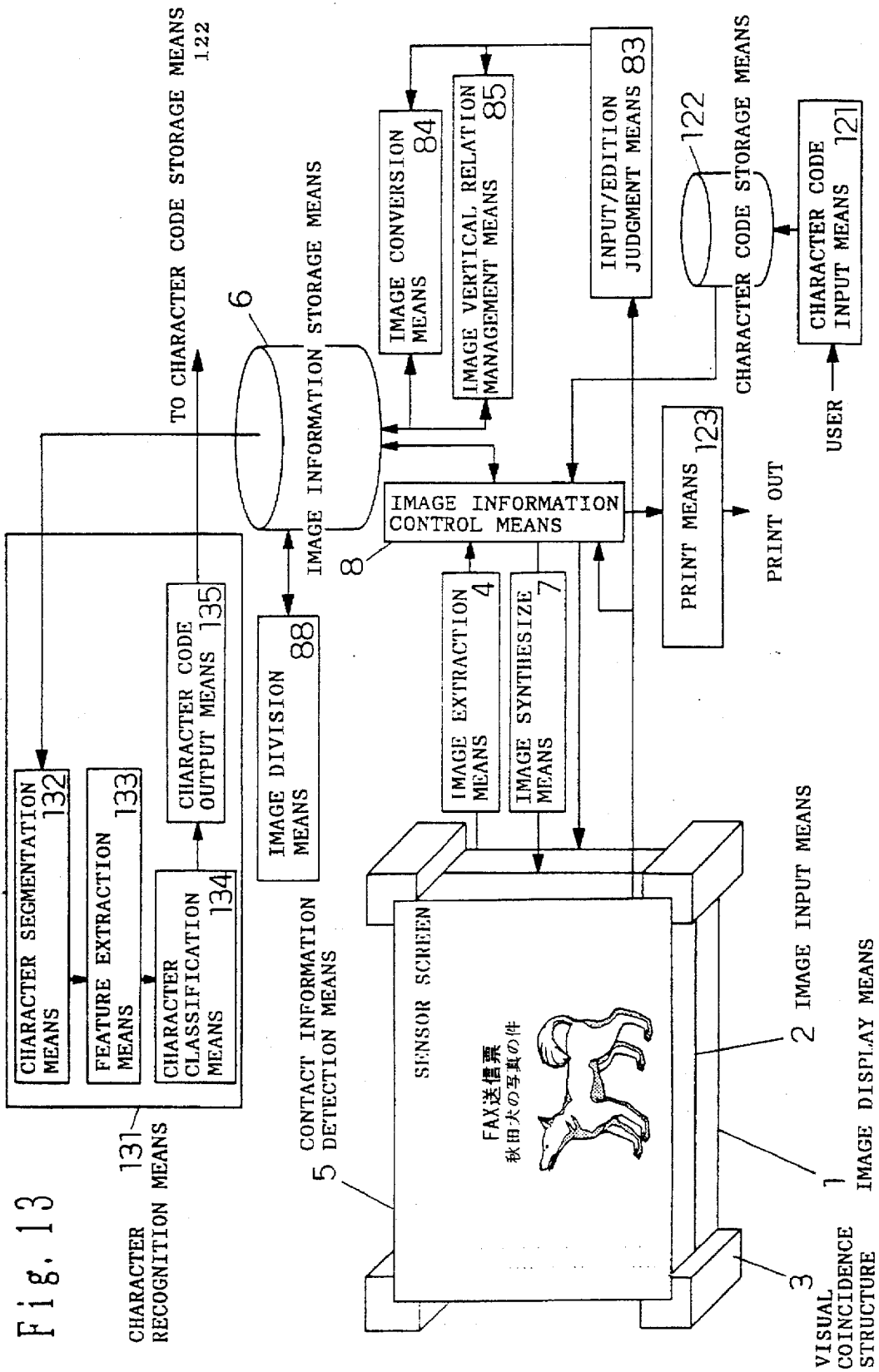
FIG. 13 is a diagram showing the configuration of an embodiment of the ninth aspect of the invention.

FIG. 13 is a diagram showing the configuration of a fifth embodiment of the invention. The reference numeral 131 designates character recognition means, 132 designates character segmentation means, 133 designates feature extraction means, 134 designates character classification means, and 135 designates character code output means. The character recognition means 131 conducts a character recognition process on an image divided as a character string portion, to convert it into character codes. The operation of the embodiment will be described below.

It is assumed that a hand-written picture or sentences on a sheet which the user intends to be beautified are previously stored in the image information storage means 6 in the manner described above.

The character segmentation means 132 reads out image information which are stored in the image information storage means 6 and has an attribute label indicative of a character string portion, extracts images of characters, and supplies them to the feature extraction means 133. From an incoming character image, the feature extraction means 133 calculates amounts indicating the shape and size of the character, such as densities of components of a contour line in horizontal, vertical and oblique directions, and the area of a circumscribed rectangle, as character feature amounts. The calculated feature amounts are supplied to the character classification means 134. The character classification means 134 compares with the incoming character feature amounts with character feature amounts which are previously extracted from images of standard characters and correspond to the character codes, and decides the character code to which the character image provided with the incoming character feature amounts corresponds. The corresponding character code is sent to the character code output means 135. The character code output means 135 supplies incoming character codes to the character code storage means 122 which in turn sequentially stores the character codes.

As described above, the operation of the means 131 conducts a character recognition on a character portion of an input image, and converts the portion into character codes, whereby hand-written characters can be beautified.

Figure 14:
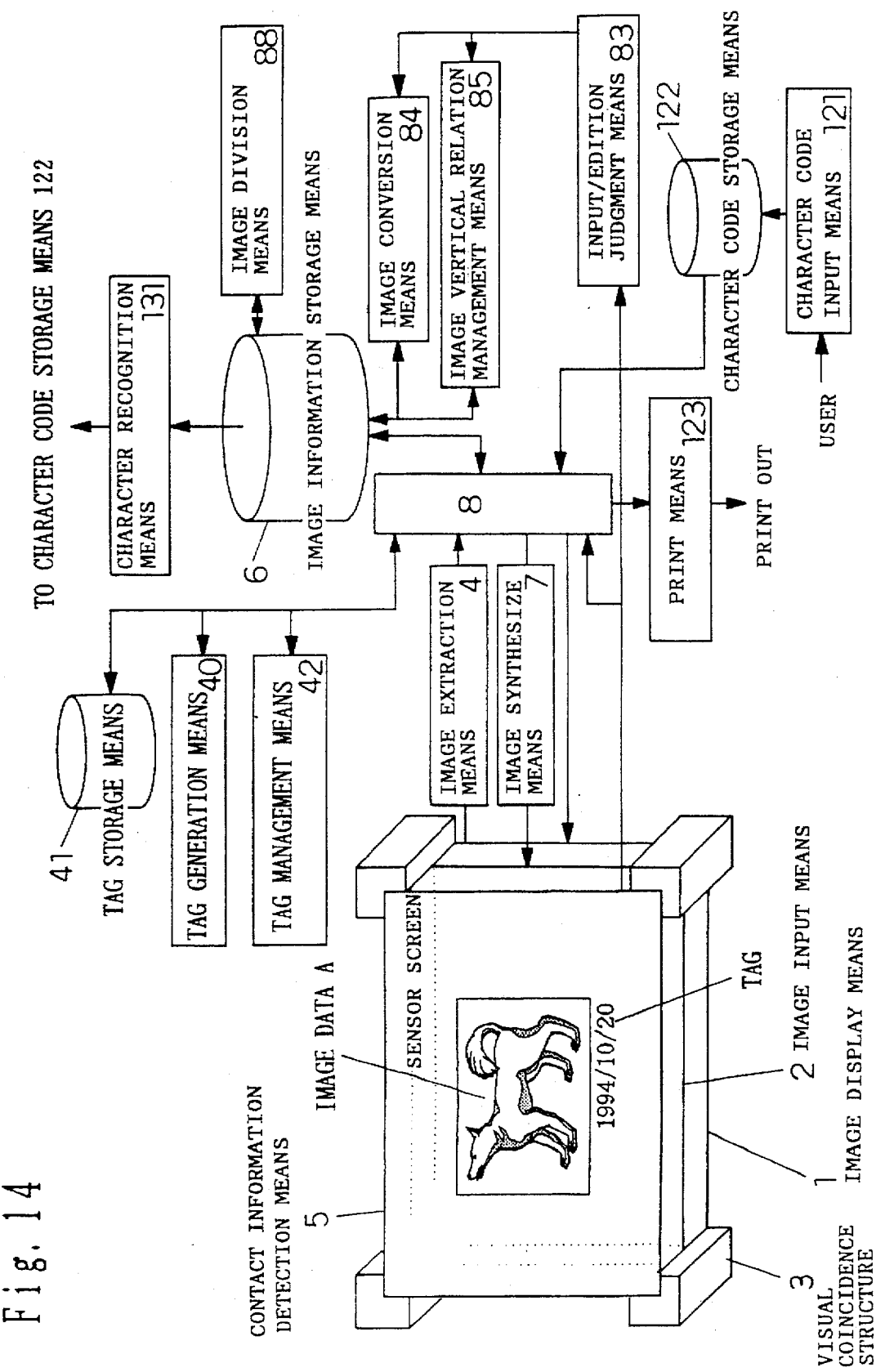
FIG. 14 is a diagram showing the configuration of an embodiment of the tenth aspect of the invention.

FIG. 14 is a diagram showing the configuration of a sixth embodiment of the invention. The reference numeral 40 designates tag generation means, 41 designates tag storage means, and 42 designates tag management means. The operation of the thus configured sixth embodiment of the invention will be described.

The tag generation means 40 generates information relating to the image input, such as a date and time when a picture drawn on a sheet face is read, the name of the user, and the object, or a title of the image data, as tag information. The generated information is stored in the tag storage means 41.

The generation of tag information may be conducted in the following manner: Tags are displayed in the form of a menu so that the user can select a required one of the displayed tags. When the user touches an applicable portion of the contact information detection means 5, the menu may be changed with another one. Alternatively, a tag may be generated by operating a key board. The user may write a title of a picture on a sheet with a pencil, and the title may be read through the image input means 2 so that the read data is used as tag information. The tag management means 42 instructs the image information control means 8 to display tag information of an image data A on the image display means 1 in a manner corresponding to the arrangement state of the image data A stored in the image information storage means 6. In the embodiment, the tag management means 42 issues instructions so that the date and time when the picture is read are displayed below the picture as tag information.

When such tag information is added to image data in the manner described above, the user can easily know input information and a title of the image data. Furthermore, the image data A can be subjected to a retrieval by checking tag information.

Finally, the image information control means 8 controls the image display means 1 so as to display the image data A in accordance with the coordinate position and vertical relation between the image data A and other image data which are stored in the image information storage means 6. Furthermore, in accordance with instructions from the tag storage means 41, tag information such as the date and time when the image data A are read is displayed below the image data A. As described above, the provision of the tag generation means, the image information storage means, and the tag management means can realize an electronic filing function in which operations of inputting and outputting data are easy and simple.

FIG. 15 is a diagram showing the configuration of a seventh embodiment of the invention. The reference numeral 152 designates image data recognition means which conducts an image recognition process on a region judged as a drawing, a photograph, or a picture by the image division means 88, and encodes image data A. The reference numeral 153 designates an image data base which stores the image data A or coded image data, and 154 designates key word generation means which automatically generates a key word for retrieval of image data, from tag information of the image data, or the coded image data A obtained by the image data recognition means 152. The reference numeral 155 designates data base management means which conducts data base management processes such as registration of the image data A or the coded image data A into the image data base 153, and retrieval using key words obtained from the key word generation means 154.

The reference numeral 156 designates image invisible means which makes the image data A invisible by resorting the image data A in the unit of one line or enciphering coded image data, and 157 designates user identification means which matches the user with registered persons for image data on the basis of ID information such as a password, a signature, or a fingerprint. The reference numeral 158 designates image visible means which, when the user is identified as a registered person for image data by the user identification means 157, restores the image data A which were made invisible by the image invisible means 156 to the original state.

The reference numeral 159 designates page information storage means which stores information of one screen displayed on the image display means 1 (i.e., information indicative of the contents of the image data A and the manner of locating the image data A on the screen), as page information. The reference numeral 160 designates page management means which recognizes a page-turn indication displayed on the image display means 1 on the basis of the position of the contact information detection means 5 where a finger of the user touches, reads out page information corresponding to the recognition result from the page information storage means 159, and instructs the image information control means 8 to display an image corresponding to the page information on the image display means 1. The reference numeral 161 designates index storage means which stores indexes of page information classified in accordance with the contents, and 162 designates index management means which recognizes an index indication displayed on the image display means 1 on the basis of the position of the contact information detection means 5 where a finger of the user touches, reads out page information corresponding to the recognized index from the index storage means 161, and instructs the image information control means 8 to display an image corresponding to the page information on the image display means 1.

The operation of the embodiment in the case where abstracts of patent publications are electronically filed will be described. In the example, the image of each abstract is read and displayed on the image display means 1, and the data of the abstract are registered into the image data base 153. In the registering operation, a character region of the abstract is converted into character codes and then registered into the image data base 153, and images of other drawing or picture regions are registered as they are.

In the operation of the embodiment in the above-mentioned case, the steps in which the user presses the abstract against the contact information detection means 5, the image input means 2 reads the abstract, only the image portion of the abstract is extracted by the image extraction means 4, and the image data A of the portion is displayed on the image display means 1 are conducted in the same manner as those of the first embodiment. Therefore, their detailed description is omitted. Hereinafter, the operation in which the data of the displayed abstract are registered into the data base classified according to technical fields will be described.

In the manner described above, first, the image division means 88 divides the image data A into a character region, a drawing region, and a picture/photograph region, with using properties such as "a character string generally elongates along one direction", "a picture or a photograph generally has plural gray levels", and "a graph or a drawing has a large blank area". Since an abstract of a patent publication is to be filed in the example, the image division means 88 divides the image data A of the abstract into a character region, and a drawing/picture region, and the data of the regions are stored in the image information storage means 6.

The image data recognition means 152 reads out the drawing/photograph/picture region of the image data A stored in the image information storage means 6, and conducts an image recognition process by comparing the feature amounts of a drawing of the image data A with feature amounts of a standard shape in the same manner as described in conjunction with the character recognition means 131, thereby converting the portion into codes indicative of a line, a circle, or the like. The codes are supplied to the key word generation means 154, and the data base management means 155. In the same manner as described above, the character recognition means 131 reads out the character region of the image data A stored in the image information storage means 6, and conducts a character recognition process on the region to encode characters in the region. The character codes are supplied to the key word generation means 154, and the data base management means 155. In the embodiment, the drawing/picture region is encoded so that data of the region can be used in a CAD system or the like. Alternatively, the image data of the drawing/picture region may be supplied as they are to the data base management means 155.

The key word generation means 154 automatically generates key words for image data retrieval, on the basis of the tag information of the image data A generated by the tag generation means 40, or the character codes output from the character recognition means 131 and the codes output from the image data recognition means 152. The generated key words are supplied to the data base management means 155. From the abstract consisting of the character codes, therefore, a key word relating to the patent described in the abstract is automatically generated. The key word is decided based on the occurrence frequencies of terms of sentences written in the abstract.

The abstract which is read through the image input means 2 is displayed on the image display means 1. In this display, the character region which has been converted into character codes is displayed in the form of an electronic document similar to that displayed on a screen of a word processor. The drawing in the other region is displayed as it is, or in the form of an image.

The page management means 160 handles the display screen as one page, and controls the page information storage means 159 so as to store information of the one page (i.e., information indicative of the contents of the sentences and image and the manner of locating them on the screen). As the number of abstracts which have been read are increased, the number of pages is increased. On the basis of the page information stored in the page information storage means 159, the page management means 160 manages the display screen of the image display means 1. Specifically, when the user touches with a finger the page-turn indication displayed on the image display means 1, the page management means 160 recognizes the page turn instructed by the user, based on the contact position information supplied from the contact information detection means 5. Depending on the recognition result (the pages are to be turned forward, or the pages are to be turned rearward), the page management means 160 reads out corresponding page information from the page information storage means 159, and instructs the image information control means 8 to display a display screen corresponding to the page information on the image display means 1.

The thus configured page management means 160 enables the user to switch the display screen only by touching a specific portion of the sensor screen of the contact information detection means 5. Consequently, the user can easily turn the pages with a feeling such as that caused in a usual operation of turning pages of a book.

The page information is classified by the user in accordance with the contents of the display screen. The user employs the classification items as indexes in a retrieval of a display screen. In the embodiment, in order to realize such a retrieval function, page information corresponding to the pages is stored in the index storage means 161. On the basis of the page information, the index management means 162 manages the display screen of the display panel 1. Specifically, when the user touches with a finger an index indication indicative of a classification item and displayed on the image display means 1, the index management means 162 recognizes the index indicated by the user, based on the contact position information supplied from the contact information detection means 5. Using the technical field of the abstract as an index, therefore, a retrieval operation for each field can be conducted over the display screen.

The thus configured index management means 162 enables a display screen required by the user to be immediately retrieved and displayed only by touching a specific portion of the sensor screen of the contact information detection means 5. The operation can easily be understood at a glance so that the operability is improved. In the above, page information is classified by the user. Alternatively, page information may be classified automatically by using key words generated by the key word generation means 154.

The data base management means 155 registers the image obtained from the image division means 88, and the coded sentences and image coded by the character recognition means 131 and the image data recognition means 152, into the data base 153, together with the key words generated by the key word generation means 154. Consequently, the character region of the abstract in the form of character codes, and the drawing region as it is or in the form of an image are registered into the data base 153, together with the key words for data retrieval. Alternatively, abstracts may be registered according to fields, based on page information stored in the page information storage means 159, and the index storage means 161. Since key words of abstracts are generated by the key word generation means 154, the abstracts may be classified according to fields, whereby the data of the abstracts may be formed as a data base system according to fields.

The image invisible means 156 randomly resorts (or scrambles) the image data A in the unit of one line or enciphers the coded image data A, thereby making the image data A invisible. When the invisible data are registered into the data base 153 by the data base management means 155, it is possible to prevent the image data A from being accessed with using a usual method by another person.

When the invisible data is to be made visible, the user inputs ID information such as a password, a signature, or a fingerprint. For example, methods of inputting ID information include a method wherein a number or a signature is written directly on the sensor screen of the contact information detection means 5, and that wherein information which is written on a sheet with a pencil is read through the image input means 2. After a password or ID information is input, the user identification means 157 matches the input information with the password or ID information which was registered by the data registrant, to judge whether the user is the data registrant or not. If the user is judged to be the data registrant, the image visible means 158 restores the invisible image data to the original state or be visible on the image display means 1. This combination of the image invisible means 156, the user identification means 157, and the image visible means 158 can hide the image data A which must be concealed from another person. The operation of the seventh embodiment of the invention has been described.

As described above, according to the embodiment, the image data recognition means 152 encodes the image data A read through the image input means 2, whereby effects that data can easily be edited or constructed as a data base, and that a retrieval can easily be conducted on the data base are attained in addition to the effects of the first embodiment. As compared with a system in which images are stored as they are, the storage capacity required for the data base is very small.

For each of the image data A, furthermore, the key word generation means 154 automatically generates key words for data retrieval. Therefore, the user is not required to take the trouble of inputting key words. When image data are classified with using the key words, the image data can automatically be constructed as a data base in accordance with the classification items, thereby eliminating the labor of the user.

FIG. 16 is a diagram showing the configuration of an eighth embodiment of the invention. The reference numeral 1 designates image display means, 2 designates image input means, 3 designates a visual coincidence structure, 4 designates image extraction means, 5 designates contact information detection means, 6 designates image information storage means, 7 designates image synthesize means, 8 designates image information control means, 123 designates print means, and 50 designates facsimile communication means. The operation of the facsimile apparatus of the embodiment having the above-mentioned configuration will be described with reference to the figure.

First, the operation conducted when a picture or sentences are read to be transmitted will be described. The user first presses a sheet against the image input means 2 while directing downward the sheet face bearing the picture or sentences. As described above, the contact information detection means 5 supplies information of the reading position and a trigger signal for the reading operation, to the image information control means 8. The image information control means 8 then sends a trigger signal for initiating the reading operation to the image input means 2. At this time, the image which is displayed on the display screen opposed to the input portion is allowed to remain displayed as it is.

The information of the position of the input portion may be previously determined. In this case, the input position may be displayed on the display screen of the image display means 1 to indicate the position to the user. This can simplify the operations such as the positioning operation.

The image input means 2 which has received the trigger signal reads out image information from the pressed sheet, and supplies it to the image extraction means 4. The specific configuration and operation of the image input means 2 are the same as those described above. The image extraction means 4 extracts only the portion corresponding to the pressed sheet, and sends the information of the extracted image to the image information control means 8. The specific configuration and operation of the image extraction means 4 are the same as those described above.

The image information control means 8 controls the image information storage means 6 to store the image information, and reverses the image so as to be in the normal direction with respect to the user. The image information is sent to the image display means 1. The image display means 1 displays the image information sent from the image information control means 8, to exhibit it to the user. Consequently, the user can check the image to be transmitted by seeing the image displayed on the image display means 1, thereby eliminating erroneous transmission due to a read error.

After checking the image to be transmitted, the user inputs a command for triggering the transmission, and also a facsimile number of the destination, into the image information control means 8. In response to the trigger signal, the image information control means 8 sends the image information currently sent to the image display means 1, and also the input facsimile number to the facsimile communication means 50. The facsimile communication means 50 transmits the incoming image information through a line in accordance with the input facsimile number, thereby completing the transmission process. The operation in transmission has been described.

Next, the operation in reception will be described. When the facsimile communication means 50 receives image information through the line, the means 50 sends the incoming image information to the image information control means 8. The image information control means 8 adds the facsimile number of the sender to the image information, and controls the image information storage means 6 to store the combination of the image information and the number. The image information control means 8 sends the combination to the print means 123 which in turn prints the information and the number, thereby completing the reception process.

In the case where a facsimile number is added, when the user designates the facsimile number of the sender, the image information control means 8 displays a received image stored in the image information storage means 6 and having the same facsimile number, on the image display means 1, thereby exhibiting the image to the user.

Furthermore, the case where the received image displayed on the image display means 1 is returned together with a reply written in the image will be described. When document No. 2 is to be written as a reply in document No. 1 as shown in FIG. 16, the user first presses document No. 2 against a portion where the document is to be added. As described above, the image input means 2 reads document No. 2 in the manner as described above. As shown in FIG. 16, the image synthesize means 7 generates an image which is obtained by combining documents Nos. 1 and 2 with each other as if the image data are incorporated at the input position, and supplies the generated image to the image display means 1 to exhibit it to the user.

Image information control means 8 adds to the image information of documents Nos. 1 and 2 stored in the image information storage means 6, the same image label indicating that the image information constitutes a single image in which the two documents are combined with each other. The image information to which the image label is added is stored in the storage means. When the image information control means 8 reads out image information from the image information storage means 6 on purpose to transmit the image information, the control means reads out images to which the same image label is added. The image synthesize means 7 combines the image information with each other, and supplies the combined information to the image display means 1, and the facsimile communication means 50.

Therefore, plural images can be input on the spot so as to be combined onto one sheet, thereby reducing the burden of the user. A reply can be incorporated into a received image and the resulting image can be returned to the sender as it is. Consequently, it is not required to newly prepare a replay sheet, so that sheets are prevented from being wastefully consumed and the efficiency of the works is enhanced.

Finally, the user inputs a command for reply to the image information control means 8 by, for example, pressing a key or a button, and then the image information control means 8 automatically outputs the image information and the facsimile number added thereto to the facsimile communication means 50, whereby the reply process is completed.

FIG. 17 is a diagram showing the configuration of a ninth embodiment of the invention. The reference numeral 60 designates facsimile page management means. The operation of the embodiment will be described. The facsimile page management means 60 manages pages by adding page numbers to image information to be transmitted or received. When plural sheets of images are to be transmitted, for example, the user designates and inputs page numbers of the images during the process of inputting the images. The facsimile page management means 60 adds the designated page numbers to the image information stored in the image information storage means 6. When the user inputs the page number of a page which the user wishes to see, into the facsimile page management means 60, the page is displayed on the image display means 1. This enables the user to check an arbitrary page before transmission so that a wrong page is prevented from being transmitted. Finally, the user inputs the facsimile number of the destination, and the trigger signal for transmission into the image information control means 8, and the facsimile communication means 50 then transmits the image information, thereby completing the transmission process. This configuration allows the user to edit plural sheets of images and then transmit them.

Next, the operation in the case of receiving plural sheets of images will be described. The facsimile page management means 60 adds page numbers to pages of received image information which is supplied from the facsimile communication means 50, and controls the image information storage means 6 so that the information is stored therein.

When the user inputs the page number of a page which the user wishes to see, into the facsimile page management means 60, the image information control means 8 reads out image information having the page number from the image information storage means 6, and the image information is displayed on the image display means 1 so that the user can see the information. In the above, the user designates a page number. Alternatively, no page number is designated, and pages may automatically be displayed in sequence for a fixed period.

When a page is to be printed, the page number of the page is input, and the image information control means 8 reads out image information having the page number from the image information storage means 6, and sends it to the print means 123. Finally, the print means 123 prints out the image information.

This configuration enables only an important page to be printed so that sheets are prevented from being wastefully consumed. Furthermore, an arbitrary one of input images can be output in the form of a printout so that the device can be used also as a copying machine. Alternatively, the user may previously set the image information control means 8 so that, immediately after an image is received, the image is directly sent through the image information control means 8 to the print means 123 to be printed.

FIG. 18 is a diagram showing the configuration of a tenth embodiment of the invention. The reference numeral 871 designates stylized format storage means, and 872 designates stylized format read means. The operation of the embodiment will be described with reference to FIG. 19.

The stylized format storage means 871 stores image information of stylized formats such as a transmittal covering letter bearing the name of the user, and the facsimile number as shown in FIG. 19(1), and also image information of image marks respectively indicating the stylized formats. In response to a command input by the user, the stylized format read means 872 controls the image display means 1 so as to display thereon the image marks indicating the stylized formats stored in the stylized format storage means 871 as shown in FIG. 19(2).

When the user selects one of the image marks as shown in FIG. 19(3), the stylized format corresponding to the selected image mark is read out from the stylized format storage means 871, and displayed on the image display means 1. Data to be transmitted are incorporated into the format as described above, and then transmitted. This eliminates the necessity of preparing sheets of stylized formats such as a transmittal covering letter, thereby reducing the labor of the user and preventing sheets from being wasted. The selection of the image mark may be done by the contact information detection means 5 in the manner described above, or by pressing a button or the like.

Furthermore, the character recognition means 131 conducts a character recognition process on a character portion of an input image as described above, and converts it into character codes. This allows hand-written characters to be beautified and thereafter transmitted. The character recognition means 131 may read the facsimile number of the sender written on a received transmittable letter so that a transmission process is automatically conducted without requiring the user to input the facsimile number. The character codes may be transmitted as they are, and at the destination transmitted data may be received as character codes and displayed or printed, whereby images of excellent quality can be transmitted to the destination.

FIG. 20 is a diagram showing the configuration of an eleventh embodiment of the invention. The reference numeral 101 designates key word extraction means, 102 designates received image classification means, 103 designates received image retrieval means, 104 designates retrieval order storage means, 105 designates browsing image generation means, and 106 designates image selection means.

The character recognition means 131 conducts a recognition process on a received image and adds character strings to the image information. The key word extraction means 101 extracts words from the character strings with using a word dictionary, and a grammar dictionary, and thereafter determines the occurrence frequencies of terms, "characters following Mr., Esq., To whom it may concern, or the like", "characters indicating a place name, or a name such as a company's name", and "characters having a larger size as compared with the whole size", as key words of the received image.

On the basis of the key words extracted by the key word extraction means 101, and position information and attitudes of portions divided by the image division means 88, the image classification means 102 classifies input images in accordance with destination, sender, and kind of contents, with using knowledge such as that "characters following Mr., Esq., To whom it may concern, or the like indicate the name of the destination", "a place name, and a name written in an edge portion of a sheet indicate the address, and name of a sender", and "characters having a larger size indicate the kind of contents". Then, the image classification means 102 adds key words indicative of the classification results to the image information of the received images, as tag information, resulting in that the received images are automatically classified and tag information for classification is added to the images.

Figure 21A:
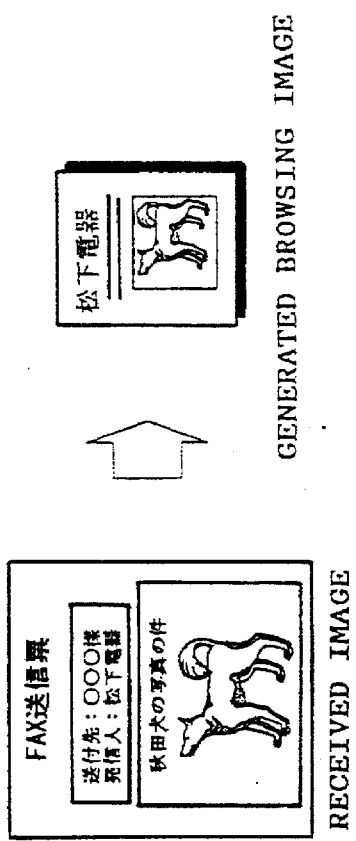
FIG. 21 (FIGS. 21(a), 21(b) and 21(c)) is a diagram showing the operation of the seventeenth aspect of the invention.
Figure 21B:
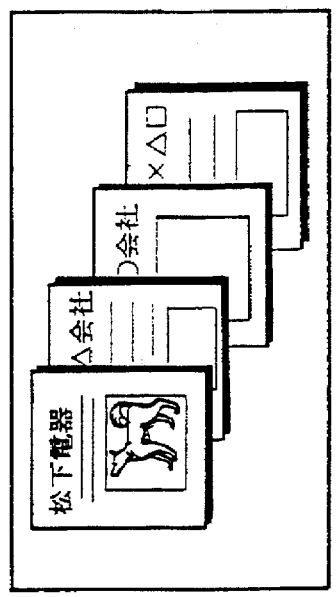
Figure 21C:
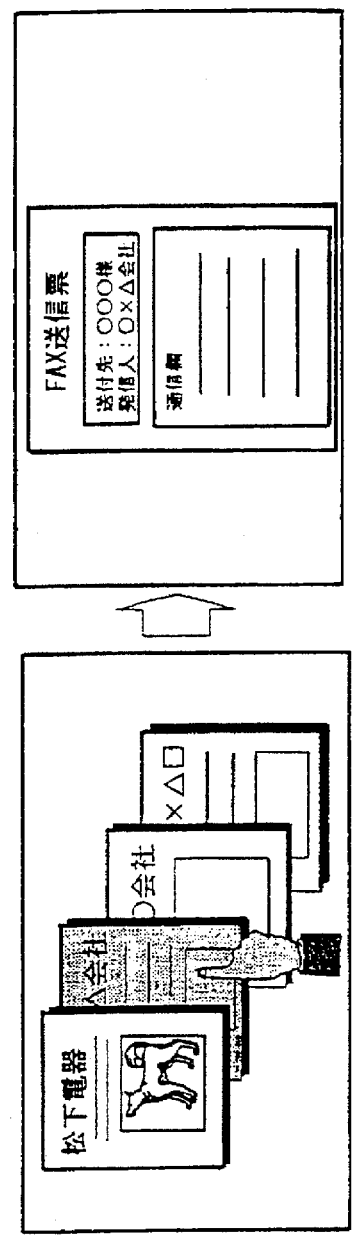

Next, the operation of the embodiment in the case where the user retrieves a received image with using such tag information will be described with reference to FIG. 21. When the user inputs a key word to be retrieved, the received image retrieval means 103 calculates the degree of coincidence between the input key word and tags which are added to the image information stored in the image information storage means 6, and outputs information indicative of the coincidence degree of each image information to the retrieval order storage means 104. The retrieval order storage means 104 stores the information in decreasing order of coincidence degree. On the basis of image information of received candidate images stored in the image information storage means 6, the browsing image generation means 105 generates browsing images each of which is obtained by combining tag information with a partial image of or a reduced image of the images as shown in FIG. 21(*a*). Next, the browsing image generation means 105 sends the generated browsing images to the image information control means 8 so that a higher candidate image is displayed at a higher hierarchy level as shown in FIG. 21(*b*), and the images are displayed on the image display means 1.

In order to obtain a desired received image, as shown in FIG. 21(*c*), the user touches one of the displayed browsing images to select it. Based on the contact position information supplied from the contact information detection means 5, the image selection means 106 judges that the browsing image displayed at the position is selected, and sends the selection result to the image information control means 8 as shown in FIG. 21(*c*). The image information control means 8 reads out the image information from the image information storage means 6 to display it on the image display means 1, thereby exhibiting the image information to the user.

As described above, according to the embodiment, an image which the user wishes to see can be read out easily and simply from plural received images, so that the burden of the user is reduced.

In the above, the first to eleventh embodiments of the invention in which the image input means 2 is configured by a one-dimensional scanner have been described. The invention can be applied in the same manner also to a configuration in which the image input means 2 is configured by a two-dimensional scanner. The embodiments in which the image display means 1, and the image input means 2 are configured as separate components have been described. The invention can be applied in the same manner also to a configuration in which these two means are integrated with each other in a device point of view. Although the embodiments in which the image display means 1, the image input means 2, and the contact information detection means 5 are configured as separate components have been described, furthermore, the invention can be applied also to a configuration in which these three means are integrated with each other in a device point of view.

The first to eleventh embodiments of the invention in which the image input means 2 is placed behind the image display means 1 using a liquid crystal have been described. The structure of the image display means 1 is not restricted to a liquid crystal display device, and may be configured by any structure such as an EL device, or FED as far as the optical transmittance can be changed. In the case where the image input means 2 is placed before the image display means 1, optical transmission is impertinent to the operation, and therefore the display means may be replaced with display means of any other kind such as a cathode ray tube, or a plasma display device.

What is claimed is:

1. An input/display integrated information processing device comprising:

image display means for displaying image information;

image input means for inputting two-dimensional image information of a two-dimensional image prepared prior to image information input by said input means, said image input means includes:

a line light source for illuminating a presented article on said input screen, a line optical sensor for reading one-dimensional light reflected by the presented article, sensor drive means for driving said line light source and said line optical sensor, and read control means for controlling said sensor drive means, said read control means including background light elimination means for, at each reading of one line, detecting image information from a difference between an output of said line optical sensor in the case where said line light source is on, and an output of said line optical sensor in the case where said line light source is off, thereby reducing noise due to external light from illumination;

a visual coincidence structure for integrally combining a display screen of said image display means with an input screen of said image input means so as to establish visual coincidence of said screens as viewed from an user;

image extraction means for extracting a previously identified portion from image information input through said image input means;

image information storage means for storing the image information of the two-dimensional image;

image information control means for controlling input/output operations of the image information; and wherein, in the integral combination in said visual coincidence structure, said image input means is placed before said image display means as viewed from the user.

2. An input/display integrated information processing device according to claim 1, wherein said image input means further includes an optical filter disposed between said line light source and said line optical sensor and through which only light from said line light source is transmitted.

3. An input/display integrated information processing device according to claim 2, wherein said image input means further includes scan control means for, in accordance with an output of said line optical sensor, controlling said line light source and said line optical sensor so as to scan only a portion corresponding to the two-dimensional image placed by the user.

4. An input/display integrated information processing device comprising:

image display means for displaying image information;

image input means for inputting two-dimensional image information of a two-dimensional image prepared prior to image information input by said input means;

a visual coincidence structure for integrally combining a display screen of said image display means with an input screen of said image input means so as to establish visual coincidence of said screens as viewed from an user;

image extraction means for extracting a previously identified portion from image information input through said image input means, said image extraction means includes:

an object image extraction means and a required portion extraction means for detecting a closed curve, when the user previously draws the closed curve enclosing a portion of the two-dimensional image, and an image information control means;

image information storage means for storing the image information of the two-dimensional image;

image information control means for controlling input/output operations of the image information; and wherein, in the integral combination in said visual coincidence structure, said image input means is placed before said image display means as viewed from the user; and said required portion extraction means includes:

extreme point detection means to scan the image information and to set a first black pixel larger than at least one adjacent white pixel as an extreme point, closed curve trace means to scan around the extreme point to detect adjacent black pixels next to white pixels and to trace the closed curve until the extreme point is reached, closed curve position storage means, said closed curve trace means sending curve information to said closed curve position storage means, and internal image extraction means controlling said closed curve position storage means to output the curve information to said image information control means for extracting the image information within the closed curve.

5. An input/display integrated information processing device comprising:

image display means for displaying image information;

image input means for inputting two-dimensional image information of a two-dimensional image prepared prior to image information input by said input means, said image input means includes:

a line light source for illuminating a presented article on said input screen, a line optical sensor for reading one-dimensional light reflected by the presented article, sensor drive means for drifting said line light source and said line optical means, and read control means for controlling said sensor drive means, said read control means including background light elimination means for, at each reading of one line, detecting image information from a difference between an output of said line optical sensor in the case where said line light source is on, and an output of said line optical sensor in the case where said line light source is off, thereby reducing noise due to external light from illumination;

a visual coincidence structure for integrally combining a display screen of said image display means with an input screen of said image input means so as to establish visual coincidence of said screens as viewed from an user;

image extraction means for extracting a previously identified portion from image information input through said image input means;

image information storage means for storing the image information of the two-dimensional image;

image information control means for controlling input/output operations of the image information; and wherein, in the integral combination in said visual coincidence structure, said image input means is placed behind said image display means as viewed from the user.

6. An input/display integrated information processing device according to claim 5, wherein said image input means further includes an optical filter disposed between said line light source and said line optical sensor and through which only light from said line light source is transmitted.

7. An input/display integrated information processing device according to claim 6, wherein said image input means further includes scan control means for, in accordance with an output of said line optical sensor, controlling said line light source and said line optical sensor so as to scan only a portion corresponding to the two-dimensional image placed by the user.

8. An input/display integrated processing device comprising:

image display means for displaying image information;

image input means for inputting two-dimensional image information of a two-dimensional image prepared prior to image information input by said input means;

a visual coincidence structure for integrally combining a display screen of said image display means with an input screen of said image input means so as to establish visual coincidence of said screens as viewed from an user;

image extraction means for extracting a previously identified portion from image information input through said image input means, said image extraction means includes:

an object image extraction means and a required portion extraction means for detecting the closed curve, when the user previously draws a closed curve enclosing a portion of the two-dimensional image, and an image information control means;

image information storage means for storing the image information of the two-dimensional image;

image information control means for controlling input/output operations of the image information;

wherein, in the integral combination in said visual coincidence structure, said image input means is placed behind said image display means as viewed from the user; and said required portion extraction means includes:

extreme point detection means to scan the image information and to set a first black pixel larger than at least one adjacent white pixel as an extreme point, closed curve trace means to scan around the extreme point to detect adjacent black pixels next to white pixels and to trace the closed curve until the extreme point is reached, closed curve position storage means, said closed curve trace means sending curve information to said closed curve position storage means, and internal image extraction means controlling said closed curve position storage means to output the curve information to said image information control means for extracting the image information within the closed curve.

* * * * *

UNITED STATES PATENT AND TRADEMARK OFFICE
CERTIFICATE OF CORRECTION

PATENT NO. : 5,742,279
DATED : April 21, 1998
INVENTOR(S) : Yamamoto et al.

It is certified that error appears in the above-indentified patent and that said Letters Patent is hereby corrected as shown below:

On the title page, item: [73] Assignee:

Please change "Matsushita Electrical Co., Ltd." to

--Matsushita Electric Industrial Co., Ltd.--.

Signed and Sealed this

Twenty-first Day of March, 2000

Attest:

Q. TODD DICKINSON

Attesting Officer

Commissioner of Patents and Trademarks